US010083246B2

(12) United States Patent
Moganti et al.

(10) Patent No.: US 10,083,246 B2
(45) Date of Patent: Sep. 25, 2018

(54) APPARATUS AND METHOD FOR UNIVERSAL PERSONAL DATA PORTABILITY

(75) Inventors: Madhav Moganti, Edison, NJ (US); Mayuresh Pandit, Chatham, NJ (US); Anish Sankalia, Lawrenceville, GA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1353 days.

(21) Appl. No.: 13/447,839

(22) Filed: Apr. 16, 2012

(65) Prior Publication Data
US 2013/0275409 A1 Oct. 17, 2013

(51) Int. Cl.
*G06F 7/00* (2006.01)
*G06F 17/30* (2006.01)
*H04L 29/08* (2006.01)

(52) U.S. Cl.
CPC .. *G06F 17/30893* (2013.01); *G06F 17/30943* (2013.01); *H04L 67/1097* (2013.01)

(58) Field of Classification Search
CPC combination set(s) only.
See application file for complete search history.

(56) References Cited

U.S. PATENT DOCUMENTS

| | | | |
|---|---|---|---|
| 2007/0055666 A1* | 3/2007 | Newbould et al. | 707/9 |
| 2010/0186066 A1* | 7/2010 | Pollard | 726/3 |
| 2011/0040736 A1 | 2/2011 | Kalaboukis et al. | |
| 2011/0225000 A1* | 9/2011 | Selim | 705/2 |
| 2012/0226559 A1 | 9/2012 | Baum et al. | |
| 2013/0232159 A1 | 9/2013 | Daya et al. | |

OTHER PUBLICATIONS

"WirelessMoves: Delicious—When the Cloud Looses Your Data—As Per Design," http://mobilesociety.typepad.com/mobile_life/2011/11/delicious-when-the-cloud-looses-your-data-as-per-design.html, printed May 8, 2012.
"World Economic Forum, Rethinking Personal Data," World Economic Forum, http://www.weforum.org/issues/rethinking-personal-data, printed May 8, 2012.
"Online Backup, Data Backup & Remote Backup Solutions, Mozy" Mozy, http://mozy.com/, printed May 8, 2012.
"Connected Backup: The Original, Undisputed Number One PC Backup Solution," Iron Mountain, http://www.ironmountain.com/Knowledge-Center/Reference-Library/View-by-Document-Type/Data-Sheets-Brochures/C/Connected-Backup.aspx, printed May 8, 2012.
"Otixo: Use All Your Cloud-Based Files From a Single Login," Otixo, http://otixo.com/, printed May 8, 2012.
"Bundlr—Organize Your Web," Bundlr, 2012. http://bundlr.com/, printed May 8, 2012.
"Curated.by | CrunchBase Profile," Crunch Base, http://www.crunchbase.com/company/curatedby, printed May 8, 2012.

(Continued)

*Primary Examiner* — Thu Nga Nguyen
(74) *Attorney, Agent, or Firm* — Tong, Rea, Bentley & Kim, LLC

(57) ABSTRACT

A universal personal data portability capability is disclosed. The universal personal data portability supports automated porting of personal data of a user from a plurality of environments to a personal data store of the user.

22 Claims, 21 Drawing Sheets

(56) References Cited

OTHER PUBLICATIONS

"Storify—Create Social Stories," Storify, http://storify.com/, printed May 8, 2012.
"PostNuke: Flexible Content Management System," PostNuke, http://www.postnuke.com/, printed May 8, 2012.
"Mambo-Open Source Content Management System," Mambo Foundation, http://mambo-foundation.org/, printed May 8, 2012.
"PhpWebSite, Open Source, Community-DrivenWebWare," phpWebSite, http://phpwebsite.appstate.edu/, printed May 8, 2012.
Artlung, "Is there any way to have search engines not index a certain section of a page?", Response to Senseful, Webmasters Stack Exchange, Jul. 20, 2010, http://webmasters.stackexchange.comquestions//1355/is-there-any-way-to-have-search-engines-not-index-a-certain-section-of-a-pagewebmasters.

* cited by examiner

APPARATUS AND METHOD FOR UNIVERSAL PERSONAL DATA PORTABILITY

TECHNICAL FIELD

This case relates generally to data portability and, more specifically but not exclusively, to portability of personal data of a user.

BACKGROUND

Users have a large quantity of personal data spread out over many different entities and environments. In many cases, users do not have control over large portions of their personal data, and may not even have access to portions of their personal data.

SUMMARY

Various deficiencies in the prior art are addressed by embodiments for providing portability of user data.

In one embodiment, an apparatus includes a processor and a memory communicatively connected to the processor. The processor is configured to initiate a request to retrieve personal data from a personal data store of a user, where the personal data stored in the personal data store has a plurality of data types assigned thereto and where the data types are configured to decouple the personal data from a plurality of associated environments from which the personal data is ported. The processor is configured to receive the requested personal data at the client device, where the received personal data includes personal data of two or more of the data types. The processor is configured to organize the received personal data based on the data types of the received personal data.

In one embodiment, a method includes using at least one processor for initiating a request to retrieve personal data from a personal data store of a user where the personal data stored in the personal data store has a plurality of data types assigned thereto and where the data types are configured to decouple the personal data from a plurality of associated environments from which the personal data is ported, receiving the requested personal data at the client device, the received personal data including personal data of two or more of the data types, and organizing the received personal data based on the data types of the received personal data.

In one embodiment, an apparatus includes a processor and a memory communicatively connected to the processor. The processor is configured to receive at least one template from a core data porting engine. The at least one template includes at least one of a template configured for use in configuring a personal data store of a user and a template configured for use in configuring at least one of a plurality of data porting agent of the core data porting engine to control porting of personal data of the user from one or more environments to the personal data store of the user. The processor is configured to propagate information entered via the at least one template toward the core data porting engine for use by the core data porting engine to configure at least one of a feature of the personal data store and a feature of at least one of the data porting agents.

In one embodiment, a method includes using at least one processor for receiving at least one template from a core data porting engine where the at least one template includes at least one of a template configured for use in configuring a personal data store of a user and a template configured for use in configuring at least one of a plurality of data porting agent of the core data porting engine to control porting of personal data of the user from one or more environments to the personal data store of the user and propagating information entered via the at least one template toward the core data porting engine for use by the core data porting engine to configure at least one of a feature of the personal data store and a feature of at least one of the data porting agents.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a universal personal data portability (UPDP) capability is depicted and described herein, although various other capabilities also may be presented herein.

Various embodiments of the UPDP capability provide porting of user data (referred to herein as personal data of a user, which may include public data of the user, private data of the user, work-related data of the user, and the like, as well as various combinations thereof) from various locations to a UPDP Store of the user (which also may be referred to herein as a personal data store of the user in that it stores data associated with the user). The personal data of the user that is ported to the UPDP Store of the user may be ported from various types of environments, such as one or more of telecommunications environments (e.g., wireline, wireless, satellite, Internet, and the like), application provider environments, services environments, utilities environments, and the like. The UPDP store of a user may be a logical data store which may be implemented using one or more physical storage locations which may be implemented using one or more physical storage devices.

Various embodiments of the UPDP capability provide automated, proactive, and real-time porting of personal data of a user from various locations to a UPDP Store of the user, from which the user may access and control his or her personal data. The UPDP capability may be automated and proactive in that it supports automatic and proactive parsing of sent and received data (i.e., bi-directional data parsing) and automated and proactive porting of sent and received data of the user to the UPDP Store of the user. The UPDP capability may be real-time in that the personal data of the user is automatically ported to the UPDP Store of the user in real-time as the personal data becomes available and/or as determinations are made that the personal data is to be ported to the UPDP Store of the user. The UPDP capability is personal in that the data of the user is ported to the UPDP Store of the user such that the personal data is available forever while the user retains control over security/privacy of his or her data. The UPDP capability, by allowing cloudification of the personal data of a user, provides a highly resilient, always-on solution for personal data management for users. Various embodiments of the UPDP capability address the digital lifestyle needs of the user.

Figure 1:
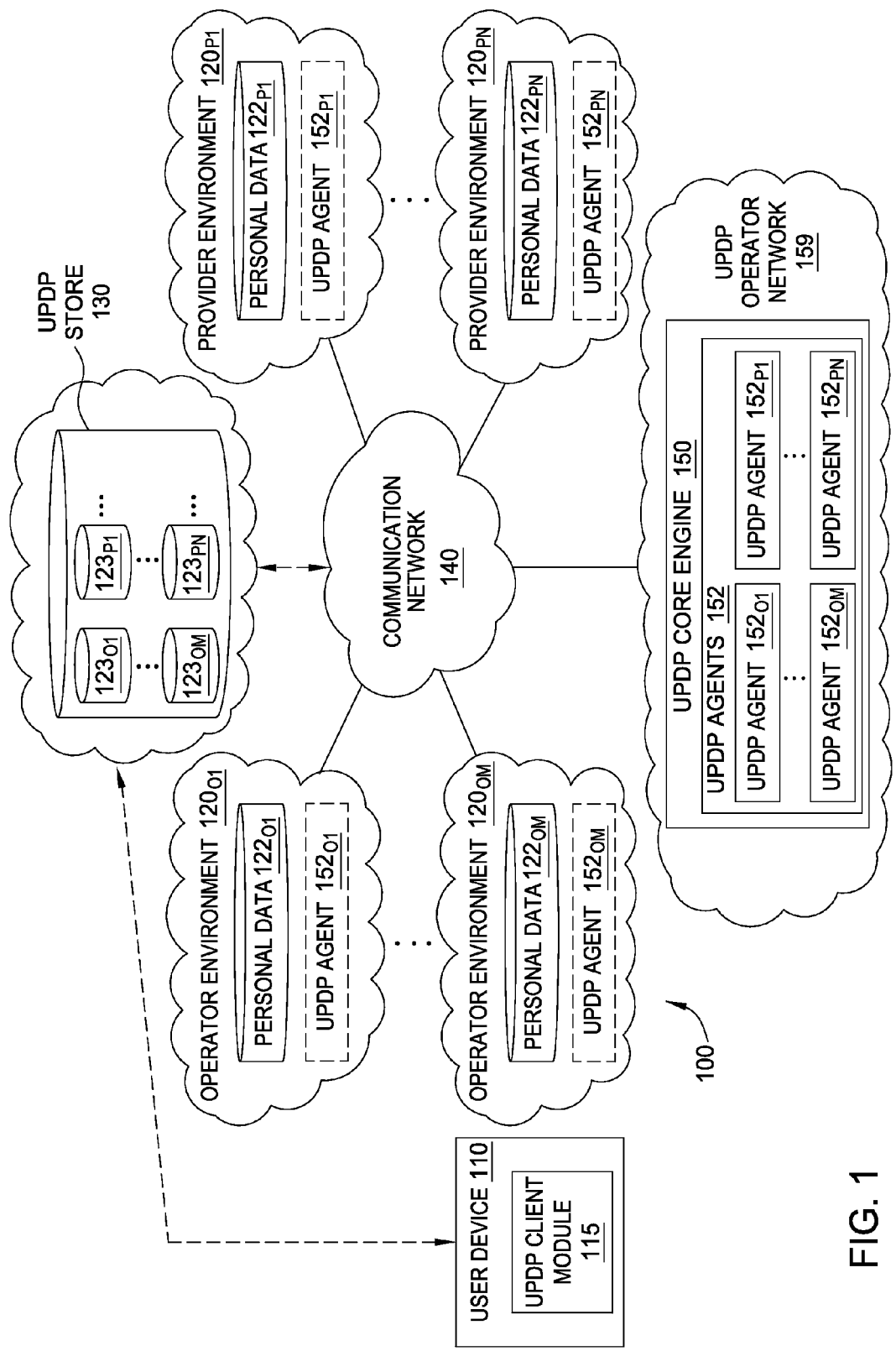
FIG. 1 depicts a high-level block diagram of an exemplary system configured to support universal personal data portability (UPDP)

FIG. 1 depicts a high-level block diagram of an exemplary system configured to support universal personal data portability.

As depicted in FIG. 1, UPDP system 100 includes a user device 110 of a user, a plurality of environments 120 which may be accessed by the user including a plurality of operator environments $120_{O1}$-$120_{OM}$ (collectively, operator environments $120_O$) and a plurality of provider environments $120_{P1}$-$120_{PN}$ (collectively, provider environments $120_P$), and a UPDP Store 130 of the user. The UPDP system 100 also includes a communication network 140, which may be the Internet, one or more Intranets, and the like, as well as various combinations thereof, and which also may be considered to include the various elements and components of such networks (e.g., core network elements, access network elements of one or more access networks, and the like, as well as various combinations thereof). The UPDP system 100 also includes a UPDP Core Engine 150 accessible via the communication network 140 (which also may be referred to herein as a core data porting engine or a data porting control engine).

The user device 110 is configured to enable the user to participate in the UPDP system 100, thereby enabling the user to access and use various features of the UPDP capability. For example, user device 110 may be a desktop computer, a laptop computer, a tablet computer, a smartphone, and the like. As depicted in FIG. 1, user device 110 includes a UPDP Client Module 115 configured to perform various functions of the UPDP capability.

The environments 120 may include any suitable types of environments which may store personal data of the user.

The operator environments $120_O$ may include environments of any suitable communications operators (e.g., wireline network operators, wireless network operators, and the like).

The provider environments $120_P$ may include environments of any entities that collect personally identifiable information on the user.

For example, such environments may include one or more of a web environment, a work environment, a utilities services environment, a financial services environment, a medical services environment, an entertainment environment, a public services environment, a cloud environment, and the like, as well as various combinations thereof.

For example, such entities may include public information entities (e.g., media entities, government entities, and the like), retail information entities (e.g., stores, credit card companies, airlines, and the like), Internet information entities (e.g., search engines, social networking companies, websites, and the like), financial entities (e.g., banks, brokerage companies, insurers, and the like), utility entities (e.g., electric company, gas company, and the like) medical information entities (e.g., doctors, pharmacists, hospitals, and the like), information collection entities (e.g., government entities, employers, marketers, law enforcement, media, and the like), and the like.

The provider environments 120 each store personal data 122 of the user of user device 110 (illustratively, personal data $122_{O1}$-$122_{OM}$ associated with operator environments $120_{O1}$-$120_{OM}$ and personal data $122_{P1}$-$122_{PN}$ associated with provider environments $120_{P1}$-$120_{PN}$, respectively).

The personal data 122 of the user may be stored in the respective environments 120 as the user interacts with the respective environments 120, as will be appreciated by one skilled in the art. For example, the user may call a service provider and sign up for a service of the service provider (e.g., telephone service, Internet service, and the like), at which time an operator of the Internet service provider may collect and enter various types of information about the user which is then stored in the environment 120 of the Internet service provider. For example, the user may access a website online and create an account via which the user may request a product(s) or a service(s) from the entity running the website. For example, the user may register with a social networking site, create a profile for the social networking site, and interact with the social networking site, from which activities the social networking site is able to collect and store information provided by the user (e.g., general account information, postings and communications of the user, and the like), information about the user, and the like, as well as various combinations thereof. For example, the user may use a service of a service provider and, as the user uses the service, the environment 120 of the service provider may be configured to log information associated with the use of that service by the user (e.g., types of content requested from a content provider, searches performed using a search engine of an Internet searching website, user preference information of the user, and the like, as well as various combinations thereof). The types of personal data 122 stored in such environments 120 and the manner in which such personal data 122 is collected by and stored in such environments 120 will be understood by one skilled in the art.

The personal data 122 of the user may include any data that is personal to the user that may be stored in any of the environments depicted and described herein. For example, personal data 122 of the user may include one or more of account information (e.g., name, address, gender, login and password information, and the like, as well as various combinations thereof), applications of the user, electronic communications of the user (e.g., emails, Internet postings, blog information, and the like), social networking data (e.g., lists of friends on social networking sites, interactions via social networking sites, postings by the user on social networking sites, and the like), search data from searches performed by the user using one or more Internet search engines, user preference information (e.g., content preferences, product preferences, and the like), service usage information, billing information, and the like, as well as various combinations thereof.

The personal data 122 of the user, which is associated with the various environments 120, is ported into the UPDP Store 130 of the user.

In one embodiment, where the personal data 122 of the user is already stored in one of the environments 120, the personal data 122 of the user is ported from the environment 120 to the UPDP Store 130 of the user. It is noted that the personal data 122 of the user may be ported from the environment 120 to the UPDP Store 130 of the user automatically (e.g., when the personal data 122 is entered into the environment 120, in response to detection of one or more events or conditions, based on one or more rules associated with the environment 120, and the like, as well as various accommodations thereof) and/or in response to a manual request of the user.

In one embodiment, where personal data of the user is provided from the user device 110 of the user and is intended for one of the environments 120, the personal data of the user is provided to the environment 120 and is then ported from the environment 120 to the UPDP Store 130 of the user. In this embodiment, the personal data 122 of the user may be ported from the environment 120 to the UPDP Store 130 of the user in any suitable manner as described herein with respect to the case in which the personal data 122 of the user is already stored in the environment 120 (e.g., the later porting of the personal data 122 from the environment 120 to the UPDP Store 130 the user may be performed in real time (e.g., such that the environment 120 and the UPDP Store 130 of the user remain synchronized in real-time or near real-time) or off-line (e.g., automatically using delayed triggering, manually in response to requests initiated by the user, and the like)).

In one embodiment, where personal data of the user is provided from the user device 110 of the user and is intended for one of the environments 120, the personal data of the user is provided to the UPDP Store 130 of the user first, and is then provided to the environment 120 (i.e., the personal data is stored via the UPDP capability prior to being sent to environment 120 for which the personal data was originally intended). This embodiment may be provided by any device configured to detect personal data being sent from user device 110 to one of the environments 120 and initiate this process to have the personal data provided to the UPDP Store 130 before being provided to environment 120 (e.g., by UPDP client module 115, by a network device or module disposed in a path between the user device 110 and the environment 120, by a device at the edge of the environment 120, and the like).

The personal data 122 of the user may be ported into the UPDP Store 130 of the user in any other suitable manner.

The UPDP Store 130 of the user is configured to store the personal data 122 of the user as UPDP data 123 of the user. For example, personal data $122_{O1}$-$122_{OM}$ of operator environments $120_{O1}$-$120_{OM}$ may be stored as UPDP data $123_{O1}$-$123_{OM}$, respectively. Similarly, for example, personal data $122_{P1}$-$122_{PN}$ of provider environments $120_{P1}$-$120_{PN}$ may be stored as UPDP data $123_{P1}$-$123_{PN}$, respectively. It is noted that personal data 122 that is ported to UPDP Store 130 and stored as UPDP data 123 may be ported and stored in its original form and/or may be adapted into a different form (e.g., using different formatting, combined with other types of personal data, and the like, as well as various combinations thereof), such that UPDP data 123 may be considered to represent personal data 122 in original form and/or in modified form. In one embodiment, the UPDP data 123 is encrypted (e.g., by default and/or in response to requests of the user) using one or more security mechanisms. In one embodiment, the UPDP data 123 is encrypted based on the data types of UPDP data 123.

The UPDP Store 130 of the user is configured to respond to requests for UPDP data 123 initiated by the user (e.g., via user device 110 and/or any other suitable user device), which also may be considered to be requests for personal data 122 stored in environments 120 but which is now more easily obtained by the user from the UPDP Store 130. In this manner, UPDP Store 130 is configured to provide the user with direct controller over UPDP data 123 which includes the various portions of the personal data 122 from the environments 120.

The UPDP store 130 of a user may be implemented as one or more logical data store which may be implemented using one or more physical storage devices disposed at one or more physical storage locations. In at least some such implementations, the UPDP Store 130 of the user enables the personal data 122 of the user to be cloudified as UPDP data 123.

Figure 2:
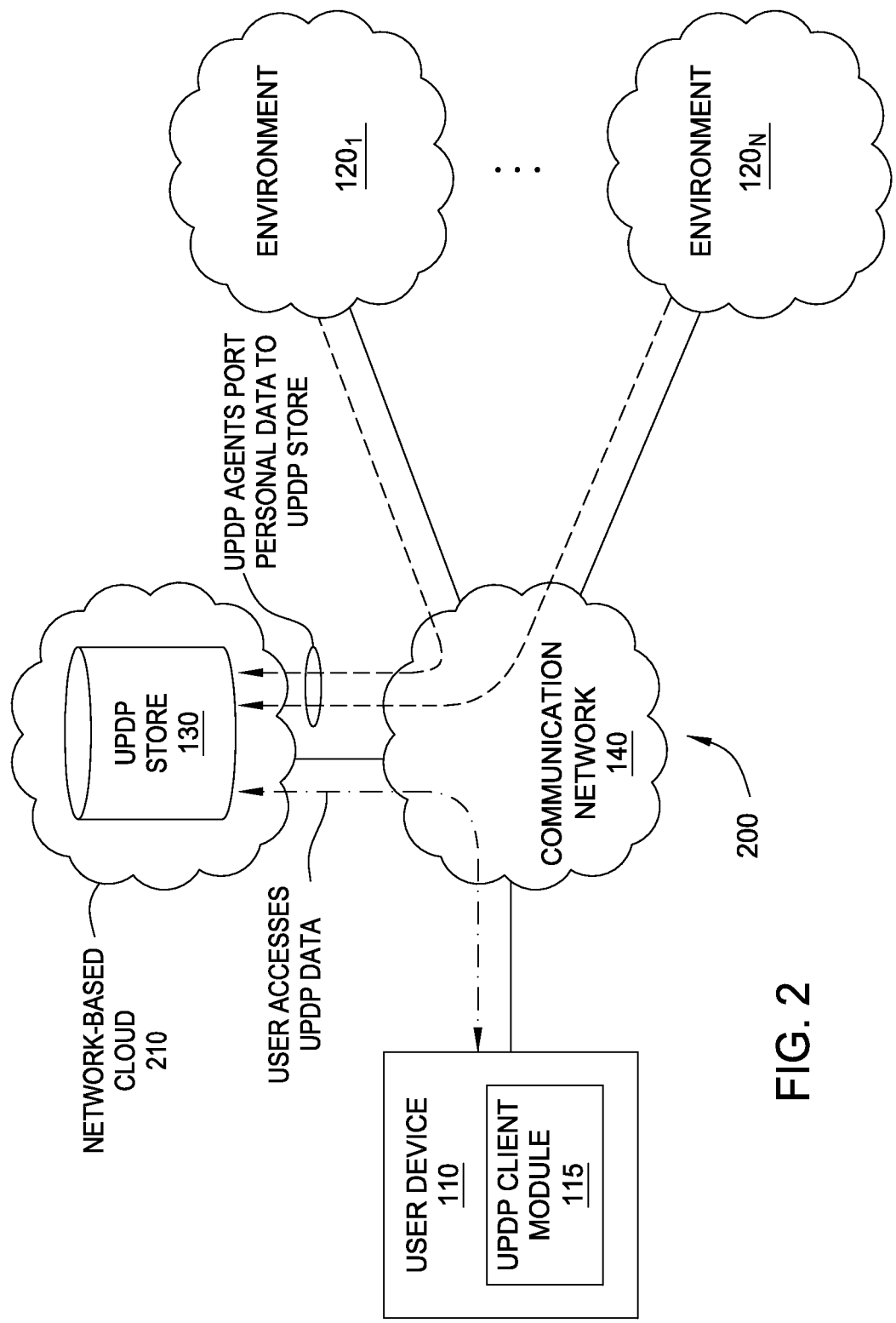
FIG. 2 depicts a high-level block diagram of an exemplary system illustrating implementation of a UPDP Store using a network-based cloud.
Figure 3:
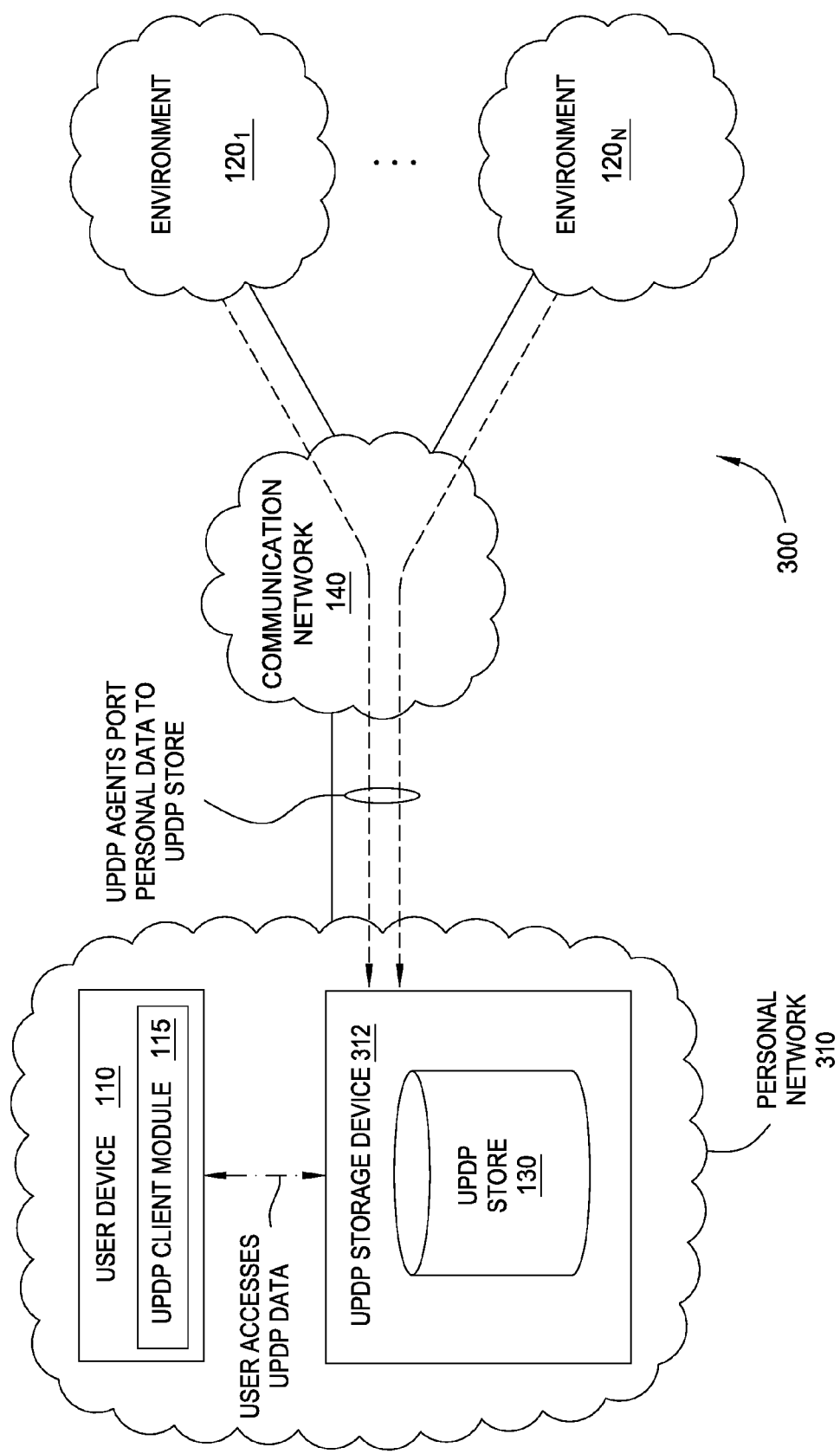
FIG. 3 depicts a high-level block diagram of an exemplary system illustrating implementation of a UPDP Store using a personal cloud.
Figure 4:
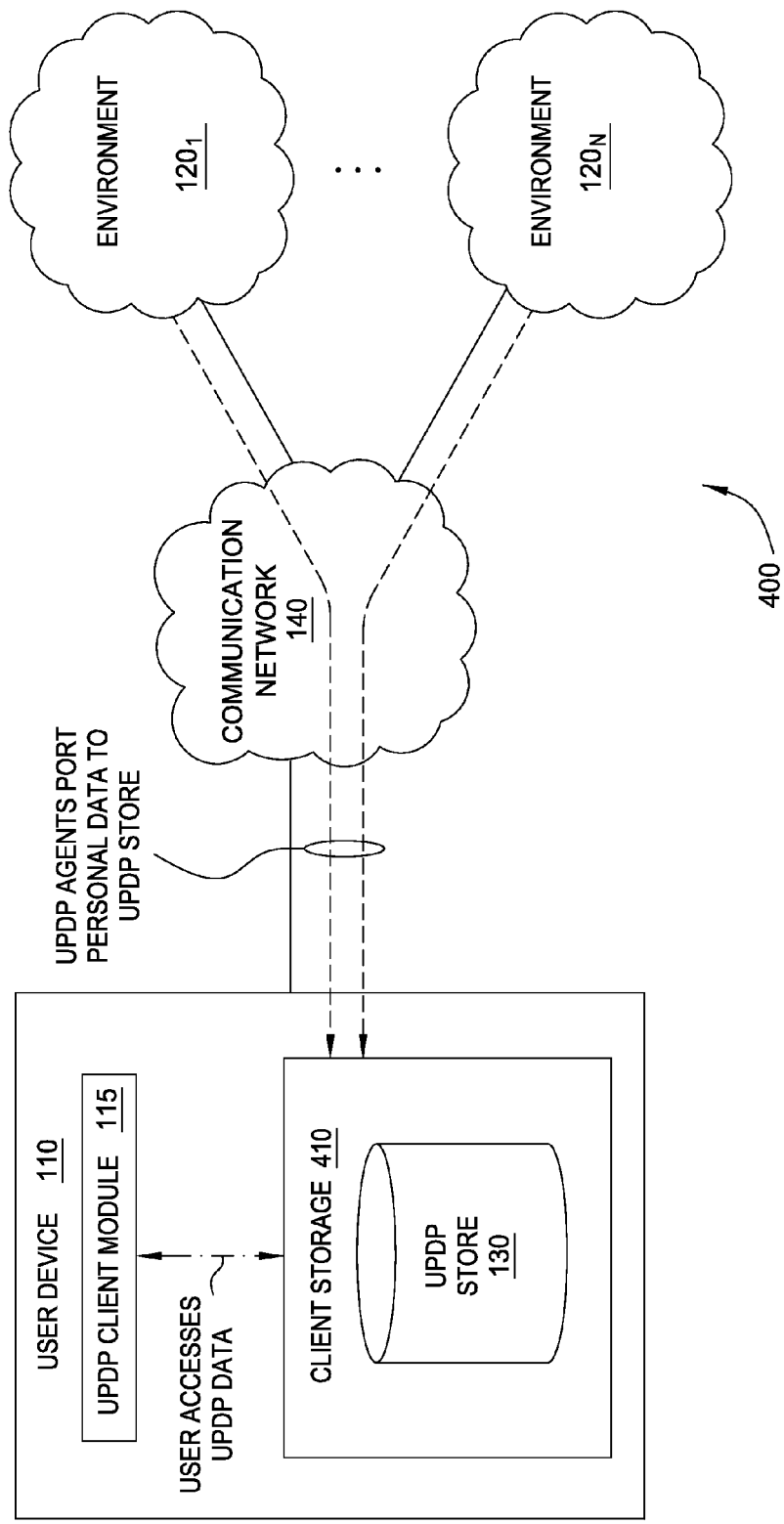
FIG. 4 depicts a high-level block diagram of an exemplary system illustrating implementation of a UPDP Store using storage space on a client device.

The UPDP Store 130 of the user is depicted as being accessible by user device 110 for purposes of illustrating that the UPDP data 123 that is stored in UPDP Store 130 may be accessed by the user at any time. The UPDP Store 130 of the user is depicted as being accessible from communication network 140 for purposes of illustrating that the UPDP data 123 that is stored in UPDP Store 130 may be ported to the UPDP Store 130 from the environments 120. The UPDP Store 130 may be implemented in any manner suitable for cloudifying the personal data 122 of the user as personal data 122. FIGS. 2-4 depict exemplary embodiments for implementation of UPDP Store 130.

FIG. 2 depicts a high-level block diagram of an exemplary system illustrating implementation of a UPDP Store using a network-based cloud. As depicted in FIG. 2, in exemplary system 200 the UPDP Store 130 of the user is implemented using a network-based cloud 210. The network-based cloud 210 may use one or more cloud services of one or more cloud service providers (e.g., using a cloud service(s) of a communications service provider, using a cloud service(s) of a third-party cloud provider, and the like, as well as various combinations thereof). The personal data 122 of the user is ported from environments 120 to UPDP Store 130 in network-based cloud 210 (to provide thereby UPDP data 123) via the communication network 140. The user accesses UPDP data 123 of UPDP Store 130 from the network-based cloud 210 via the communication network 140.

FIG. 3 depicts a high-level block diagram of an exemplary system illustrating implementation of a UPDP Store using a personal cloud. As depicted in FIG. 3, in exemplary system 300 the UPDP Store 130 of the user is implemented using a personal network 310 including a UPDP storage device 312 which may be used as a personal cloud of personal network 310. The personal network 310 may be a home network of the user of user device 110 or any other suitable network hosting a user device(s) of the user. The UPDP storage device 312 may be any UPDP-enabled plug and play device configured to store UPDP data 123 of UPDP Store 130 (e.g., including built-in preprogrammed intelligence related to supporting UPDP functions). The personal data 122 of the user is ported from environments 120 to UPDP Store 130 in UPDP storage device 312 of personal network 310 (to provide thereby UPDP data 123) via the communication Network 140. The user accesses UPDP data 123 of UPDP Store 130 from UPDP storage device 312 of personal network 310 via user device 110 or any other user device via which the user may access personal network 310.

FIG. 4 depicts a high-level block diagram of an exemplary system illustrating implementation of a UPDP Store using storage space on a client device. As depicted in FIG. 4, in exemplary system 400 the UPDP Store 130 of the user is implemented using client storage 410 of user device 110. Although primarily depicted and described with respect to an embodiment in which client storage 410 is internal storage of user device 110, it is noted that client storage 410 may include internal and/or external storage of user device 110. The personal data 122 of the user is ported from environments 120 to UPDP Store 130 in client storage 410 of user device 110 (to provide thereby UPDP data 123) via the communication network 140. The user accesses UPDP data 123 of UPDP Store 130 from client storage 410 of user device 110 locally at user device 110.

Although omitted for purposes of clarity, it is noted that combinations of two or more of the personal data store implementations of FIGS. 2-4 may be used in combination to provide the UPDP Store 130.

Returning now to FIG. 1, it is noted that the UPDP Store 130 enables the personal data of the user to be cloudified from everywhere into the UPDP Store 130 using any suitable implementation of UPDP Store 130 (e.g., using one or more of the implementations of FIGS. 2-4 for the UPDP Store 130 and/or any other suitable implementation for UPDP Store 130). The UPDP Store 130 is accessible by the user from anywhere at any time for any current or future service. The UPDP Store 130 is a high resiliency solution that prevents loss of personal data 122 by enabling multi-storage/location portability such that the personal data 122 is highly portable/reliable and is available to and in control of the user as UPDP data 123 at all times.

The UPDP Core Engine 150 is configured to perform various functions of the UPDP capability.

The UPDP Core Engine 150 maintains UPDP Agents 152 which are configured to use by UPDP Core Engine 150 to control automatic porting of the personal data 122 of the user from the environments 120 to the UPDP Store 130 of the user. As depicted in FIG. 1, UPDP Core Engine 150 maintains UPDP Agents for each of the environments (illustratively, UPDP Agents $152_{O1}$-$152_{OM}$ associated with operator environments $120_{O1}$-$120_{OM}$ and UPDP Agents $152_{P1}$-$124_{PN}$ associated with provider environments $120_{P1}$-$120_{PN}$, respectively). This enables automatic cloudification of the personal data 122 of the user from everywhere to the UPDP Store 130 of the user.

The UPDP Core Engine 150 is configured to initiate automatic porting of the personal data 122 of the user from the environments 120 to the UPDP Store 130 of the user in response to various trigger conditions.

The trigger conditions may include detecting that personal data 122 of the user has been stored in one of the environments 120, detecting that the user is providing personal data 122 to one of the environments 120, detecting that a particular data/time (e.g., where personal data 122 is to be ported on particular days, at particular times of day, and the like, as well as various combinations thereof), detecting that a threshold length of time has passed since personal data 122 of the user was last ported to UPDP Store 130, and the like, as well as various combinations thereof. It is noted that the trigger conditions also may be considered to include any detection of receipt of a request by the user for personal data 122 of the user to be ported to UPDP store 130 of the user.

The trigger conditions may be defined as part of the UPDP Agents 152 and/or managed by the UPDP Core Engine 152 without being defined as part of the UPDP Agents 152. In any event, however, each of the UPDP Agents 152 may have one or more trigger conditions defined therein and/or otherwise associated therewith. For example, UPDP Core Engine 150 may monitor two trigger conditions for UPDP Agent $152_{O1}$ associated with environment $120_{O1}$ (assumed, in this example, to be associated with a wireless service provider) as follows: (1) a trigger condition indicating that billing data for the user is to be ported to the UPDP Store 130 of the user each the time billing information is stored as part of the personal data $122_{O1}$ in environment $120_{O1}$; and (2) a trigger condition indicating that service usage information is to be ported to the UPDP Store 130 of the user from the personal data $122_{O1}$ of the user once each day at any off-peak time. For example, UPDP Core Engine 150 may monitor two trigger conditions for UPDP Agent $152_{P2}$ associated with environment $120_{P2}$ (assumed, in this example, to be associated with a social networking application) as follows: (1) a trigger condition indicating that posts to the user by other application users via the application are to be ported to UPDP Store 130 of the user at or close to the time at which they are posted; and (2) a trigger condition indicating that posts made by the user to other application users of the application are to be ported to UPDP Store 130 of the user once each week at an off-peak time.

The UPDP Core Engine 150 may be configured to control automatic porting of the personal data 122 of the user from the environments 120 to the UPDP Store 130 of the user using UPDP Agents 152 in any suitable manner.

In one embodiment, the UPDP Core Engine 150 uses the UPDP Agent 152 for a particular environment 120 to access the relevant personal data 122 from the environment 120 and to cause the relevant personal data 122 from the environment 120 to be ported to the UPDP Store 130 of the user. This is illustrated in FIG. 1 as the UPDP Agents 152 which are included within UPDP Core Engine 150. In one embodiment, the UPDP Agents 152 are configured to simulate user interaction with the environments 120 as if the user were interacting with the environments directly (e.g., simulating user log-in and log-out behavior, and the like).

In one embodiment, the UPDP Core Engine 150 provides the UPDP Agent 152 for a particular environment 120 to that environment 120 temporarily. This is illustrated in FIG. 1 as the dotted-line boxes for UPDP Agents 152 which are included within the environments 120, thereby illustrating that, optionally, the UPDP Agent 152 for a particular environment 120 may be provided to that environment 120 and executed within that environment 120 to thereby cause the relevant personal data 122 of the user to be ported from that environment 120 to the UPDP Store 130 of the user. The UPDP Agent 152 may then be removed from the environment 120 after porting of the associated personal data 122 to the UPDP Store 130 is complete.

In one embodiment, the UPDP Core Engine 150 provides the UPDP Agent 152 for a particular environment 120 to that environment 120 such that the UPDP Agent 152 is maintained in the environment permanently (e.g., more than just temporarily at the time of porting of personal data 122). Although not specifically illustrated in FIG. 1, it will be appreciated that this could be depicted using solid-line boxes for the UPDP Agents 152 which are included within the environments 120. In one embodiment, such as where an environment 120 has a relationship with the UPDP solution, the environment 120 may provide residential space for one or more UPDP Agents 152 to reside within the environment 120 (e.g., under mutual time-bound agreements and/or in accordance with any other suitable type of agreement(s)). In one embodiment, monitoring for trigger conditions which cause a UPDP Agent 152 that is maintained in an environment 120 to initiate porting of personal data 122 from the environment 120 to UPDP Store 130 may be performed locally by the UPDP Agent 152 and/or remotely by the UPDP Core Engine 150. In the case of local monitoring for trigger conditions, detection of a trigger condition by the UPDP Agent 152 thereby causes the UPDP Agent 152 to send relevant personal data 122 from the environment 120 to the UPDP Store 130 of the user. In the case of remote monitoring for trigger conditions, detection of a trigger condition by the UPDP Core Engine 150 thereby causes the UPDP Core Engine 150 to send a data porting request to the UPDP Agent 152 of the environment 124 causing the UPDP Agent 152 to send relevant personal data 122 from the environment 120 to the UPDP Store 130 of the user. It is noted that combinations of local and remote monitoring may be used.

In at least some such embodiments, the UPDP Agents 152 may be configured to automatically port the personal data 122 of the user from the environments 120 to the UPDP Store 130 of the user. The UPDP Agents 152 may be implemented as always-on agents configured to securely port the personal data 122 to UPDP Store 130 at any time such data porting is needed or desired. In one embodiment, the UPDP Core Engine 150 is configured to act as an intelligent broker to requests from the user device 110 for data from the UPDP Store 130. This intelligent broker capability may include determining how the UPDP data 123 needs to be presented at the user device 110 and the associated presentation layer functionalities utilized to present the UPDP data 123 at the user device 110. The UPDP Core Engine 150 may be configured to provide various other types of tools for supporting porting of personal data 122 from the environments 120 to UPDP Store 130 and/or for supporting retrieval of UPDP data 123 from the UPDP Store 130 for delivery and presentation to the user.

In one embodiment, the UPDP Core Engine 150 may be configured to maintain a set of Application Programming Interfaces (APIs) which may be provided from the UPDP Core Engine 150 to environments 120 for use by the environments 120 in porting personal data 122 from the environments 120 to the UPDP Store 130 of the user. In this embodiment, an API suitable for use in an environment 120 may be provided to that environment 120, maintained on one or more elements and/or systems of that environment 120, and then used by the one or more elements and/or systems of that environment 120 to facilitate communications related to porting of personal data 122 from that environment 120 to the UPDP Store 130 of the user (e.g., to facilitate communication between the one or more elements and/or systems of that environment 120 and an associated UPDP Agent 152 maintained on the UPDP Core Engine 150 for that environment 120 and/or to facilitate transfer to the environment 120 of an associated UPDP Agent 152 maintained on the UPDP Core Engine 150 for that environment 120 such that the UPDP Agent 152 may be executed within the environment 120). The APIs may be configured at any suitable granularity (e.g., an API configured for use by multiple environments 120 of different types, an API configured for use by multiple environments 120 of the same type, an API configured for use by one of the environments 120, an API configured for use by one or more elements/systems of one of the environments 120, and the like).

In one embodiment, the UPDP Core Engine 150 may be configured to maintain a set of engines and/or tools which may be provided from the UPDP Core Engine 150 to the user device 110 of the user for use by the user device 110 in providing and/or configuring the UPDP client module 115 of the user device 110. For example, such engines and/or tools may include engines configured for use by the user in configuring aspects of personal data porting, engines configured for use by the user in configuring aspects of UPDP data presentation and control, a UPDP thin agent, and the like as well as various combinations thereof. It is noted that such engines and/or tools may be provided to the user device 110 when the user initially registers for the UPDP service, when a user requests one or more engines and/or tools for use in configuring his or her UPDP service, and the like as well as various combinations thereof.

The UPDP Core Engine 150 may be configured to provide various other functions in support of the UPDP service made available to end users. For example, UPDP Core Engine 150 may support creation, deletion, and modification of UPDP user accounts. For example, UPDP Core Engine 150 may support profile creation for automated tracking of UPDP data 123 and, thus, automated tracking of personal data 122 of the environments 120. For example, UPDP Core Engine 150 may support data decoupling functions for decoupling of personal data 122 from the environment 120 with which the personal data 122 is associated. For example, UPDP Core Engine 150 may support network re-configuration capabilities. The UPDP Core Engine 150 may be configured to provide various other functions.

The UPDP Core Engine 150 may communicate with communication network 140 in any suitable manner. In one embodiment, as depicted in FIG. 1, UPDP Core Engine 150 is implemented within a UPDP Operator Network 159 (e.g., where the UPDP Operator the UPDP service to end-users). In one embodiment, omitted from FIG. 1 for purposes of clarity, UPDP Core Engine 150 is implemented independent of the UPDP Operator Network. The UPDP Core Engine 150 may be deployed in any other suitable manner.

In this manner, the UPDP Core Engine 150 is configured to support automatic cloudification of the personal data 122 of the user from everywhere to the UPDP Store 130 of the user to form thereby UPDP data 123 accessible to the user from the UPDP Store 130.

The UPDP system 100 enables the digital life of the user to become extremely portable with seamless data continuity.

The UPDP system enables the personal data of the user to be cloudified. The UPDP system 100 enables analysis of cloudified personal data of the user, thereby providing tracking of lifestyle trends and sub-trends and, thus, providing structure and clarity to the evolving needs, behavior, and attitude of the user. The UPDP system 100 securely positions the user to intelligently and easily access and use value added data services of service and application providers without comprising privacy and security. The UPDP system 100 enables the user (i.e., the original data/content owner) to receive data offloading, data control, privacy control, data as a service channels and assets, and the like, as well as various combinations thereof. The UPDP system 100 supports session-related functions such as context-aware proactive session brokering, synchronous and/or asynchronous session brokering, real-time session following, and the like, as well as various combinations thereof. The UPDP system 100 supports quality of protection by implementing end-to-end user-defined security and privacy control. The UPDP system 100 is configured for legacy data support and future data technology support.

The manner in which various elements of UPDP system 100 provide these and other functions of the UPDP capability will be better understood by considering the UPDP Client Module 115, UPDP Agents 152, and UPDP Core Engine 150, in additional detail.

The UPDP Client Module 115 is configured to perform various UPDP client functions. An exemplary UPDP client module 115 is depicted and described with respect to FIG. 5.

Figure 5:
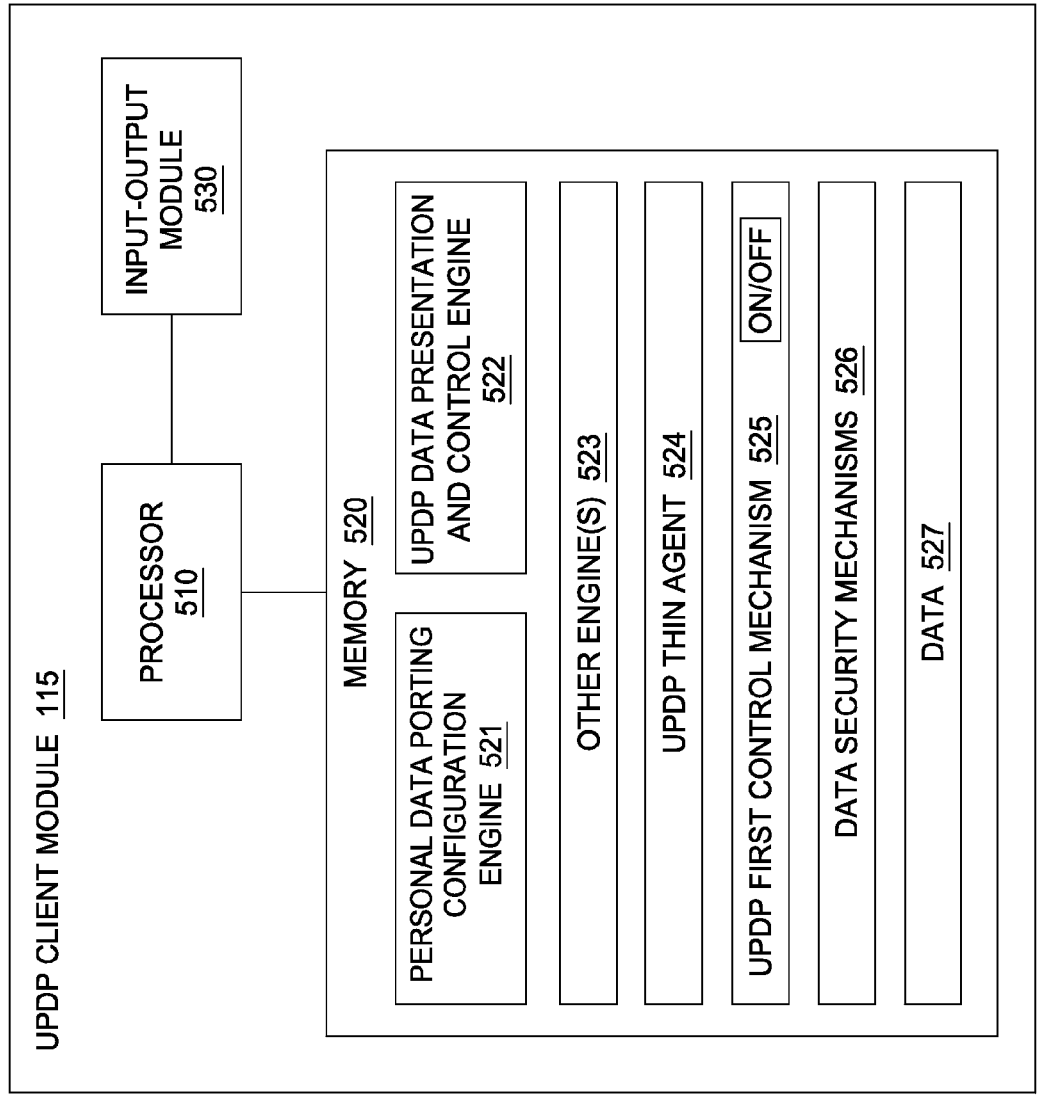
FIG. 5 depicts a high-level block diagram of an exemplary UPDP client module for use at a client device to support universal personal data portability.

FIG. 5 depicts a high-level block diagram of an exemplary UPDP client module for use at a client device to support universal personal data portability.

As depicted in FIG. 5, UPDP client module 115 includes a processor 510, a memory 520, and an input-output module 530. The processor 510 is communicatively coupled to the memory 520 and the input-output module 530. The memory 520 includes a number of elements configured to support various functions of the UPDP capability. The input-output module 530 supports communication to and from UPDP client module 115.

The memory 520 includes engines which may be executed by the processor 510 to perform various functions of the UPDP capability, including a personal data porting configuration engine 521, a UPDP data presentation and control engine 522, and one or more other functional engines 523.

The personal data porting configuration engine 521 is configured to support a capability via which the user of user device 110 can configure the UPDP service to support porting of personal data to UPDP Store 130. For example, personal data porting configuration engine 521 may be configured to provide a user interface via which the user can manage a user profile of the user for the UPDP service, manage account information of the user for the UPDP service, manage personal data porting templates (e.g., review personal data porting templates available from UPDP Core Engine 150, modify and save personal data porting templates, initiate sending of personal data porting templates to environments 120, retrieve and modify personal data porting templates maintained by the environments 120, and the like, as well as various combinations thereof), and the like, as well as various combinations thereof.

The personal data presentation and control engine 522 is configured to support presentation of UPDP data of the UPDP Store 130 to the user and control of the UPDP data of the UPDP Store 130 by the user via a user interface of user device 110.

In one embodiment, the UPDP data presentation and control engine 522 is configured to provide a user interface configured to enable the user to access the UPDP data from the UPDP Store 130.

In one embodiment, the UPDP data presentation and control engine 522 is configured to provide a plurality of applications configured to enable the user to access the UPDP data from the UPDP Store 130. The applications may be configured to provide access to respective portions of the UPDP data based on data types of the UPDP data. The applications may be configured to provide access to respective portions of the UPDP data of a given data type even where the UPDP data of the given data type is ported to the UPDP Store 130 from multiple environments 120. It is noted that the data types may be based on one or more of market segment, application type, application, demographic information, and the like, as well as various combinations thereof. It is noted that the data types may be arranged in any suitable manner, which may include hierarchical arrangements of data types (which also may include embedding of data types within other data types) using any suitable hierarchy (e.g., any suitable number of hierarchical layers, and data types per hierarchical layer, may be supported).

In one embodiment, the UPDP data presentation and control engine 522 is configured to support smart-tagging of personal data residing in the UPDP Store 130, thereby enabling faster searching, mining, and retrieval of UPDP data 123 from the UPDP Store 120.

The UPDP data presentation and control engine 522 may be configured to provide various other functions.

Figure 6:
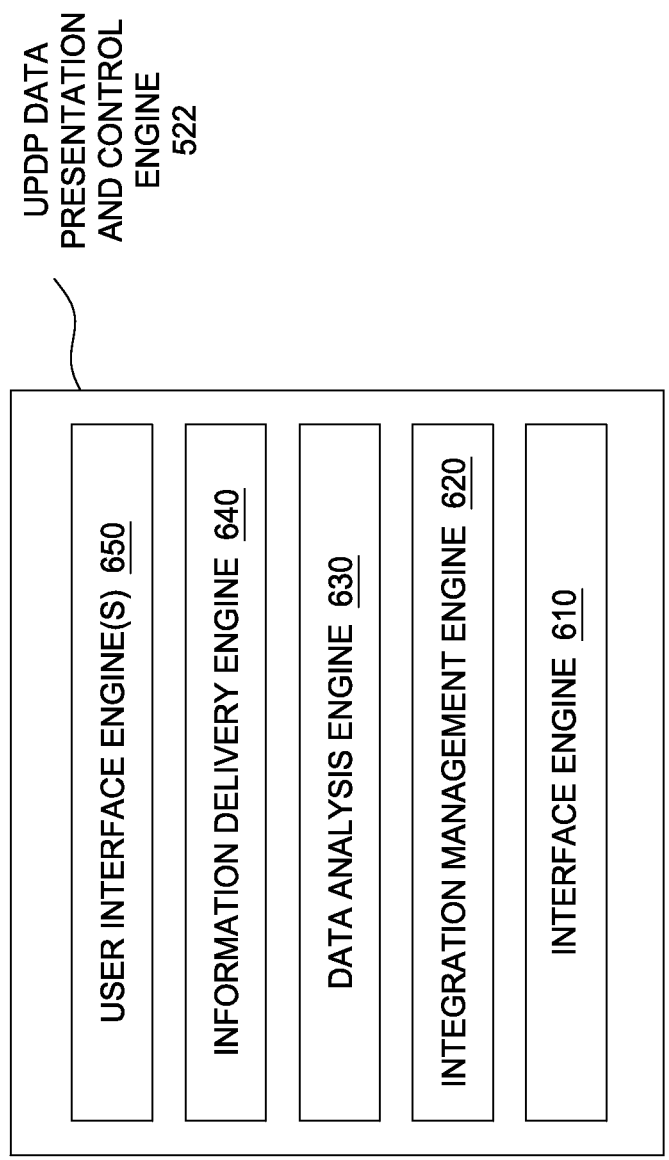
FIG. 6 depicts a high-level block diagram of an exemplary UPDP data presentation and control engine of the UPDP client module of FIG. 5.

An example embodiment of UPDP data presentation and control engine 522 is depicted and described with respect to FIG. 6.

The memory 520 includes a UPDP Thin Agent 524. The UPDP Thin Agent 524 is a lightweight UPDP Client application. The UPDP Thin Agent 524 is configured to communicate with other UPDP elements (e.g., the UPDP Store 130, UPDP Core Engine 150, UPDP Agents 152, and the like) using any suitable signaling standards (which, in at least some embodiments, may include one or more proprietary UPDP signaling standards). The UPDP Thin Agent 524 may be configured to respond to requests which are initiated by the UPDP Agents 152. The UPDP Thin Agent 524 may provide a front-end and a dashboard solution to the end user, via which the user may control various configuration options (e.g., configuration of various aspects of personal data porting, configuration of various aspects of presentation and control of UPDP data retrieved from the UPDP Store 130, and the like), request retrieval of the UPDP data from UPDP Store 130, review and interact with UPDP data retrieved from the UPDP Store 130 and presented via one or more presentation interfaces of the user device 110, and the like, as well as various combinations thereof. It is noted that, although primarily depicted and described as a standalone element (which may interact with personal data porting configuration engine 521, UPDP data presentation and control engine 522, and/or any other elements of UPDP client module 115), functions of UPDP Thin Agent 524 may be provided as part of personal data porting configuration engine 521 and/or UPDP data presentation and control engine 522.

The memory 520 includes a UPDP First Control Mechanism 525. This enables UPDP Client Module 115 to request that UPDP Core Engine 150 port personal data of the user to the UPDP Store 130 of the user first, before the personal data is provided to the environment 120 for which the personal data 122 is intended. This is illustrated as an OFF/ON toggle capability in which (1) when the mechanism is set to OFF, proactive porting of personal data 122 to UPDP Store 130 is not active (i.e., personal data 122 is provided to the appropriate environments 120 first and then ported from the environments 120 to the UPDP Store 130 of the user in accordance with the associated UPDP Agents 152), and (2) when the mechanism is set to ON, proactive porting of personal data 122 to UPDP Store 130 is active (i.e., personal data 122 is provided to the UPDP Store 130 first and is then provided to the appropriate environment 120 for storage as personal data 122 within the environment 120). The UPDP First Control Mechanism 525 may be configured such that OFF is the default setting or ON is the default setting. The UPDP First Control Mechanism 525 may be set by the user via the user device 110 in any suitable manner (e.g., using personal data porting configuration engine 521, via a UPDP front-end dashboard provided by UPDP Thin Agent 524, and the like, as well as various combinations thereof). It will be appreciated that, although depicted and described as an OFF/ON toggle capability (for purposes of clarity), a lower granularity of control may be provided (e.g., setting per data type, per environment, and the like, as well as various combinations thereof).

The memory 520 includes a Data Security Mechanism 526. The Data Security Mechanisms 526 support encryption/decryption of data related to the UPDP capability.

The memory 520 includes data 527 related to any of the various elements of the UPDP client module 115. Although primarily depicted and described with respect to an embodiment in which the UPDP client module 115 includes its own processor 510, memory 520, and input-output module 530, it is noted that UPDP client module 115 depicted and described in FIG. 5 may be considered to represent use of resources of user device 110 (illustratively, the processor, memory, and input-output capabilities of the user device 110) to support the UPDP client module 115 (e.g., the UPDP client module 115 is considered to include the engines of memory 520 being executed using the infrastructure of UPDP Client Module 115).

FIG. 6 depicts a high-level block diagram of an exemplary UPDP data presentation and control engine of the UPDP client module of FIG. 5.

As depicted in FIG. 6, UPDP data presentation and control engine 522 of user device 110 includes a set of engines configured to provide various functions from enabling user device 110 to interface with the UPDP Store 130 of the user through enabling the user to view and control UPDP data of the UPDP Store 130. More specifically, UPDP data presentation and control engine 522 of user device 110 includes an interface engine 610, and integration management engine 620, a data analysis engine 630, an information delivery engine 640, and a user interface engine 650.

The interface engine 610 is configured to enable user device 110 to interface with the infrastructure used to maintain the UPDP Store 130 of the user. For example, interface engine 610 may support interfacing with one or more of a network-based cloud where the UPDP Store 130 is maintained using a network-based cloud service, a UPDP storage device of a personal network of the user where the UPDP Store 130 is maintained using a personal cloud implementation, a client storage module(s) where the UPDP Store 130 is maintained using one or more internal and/or external storage modules associated with the user device 110. The interface engine 610 is configured to receive UPDP data from the UPDP Store 130 and provide the received UPDP data to integration management engine 620 for processing.

The integration management engine 620 is configured to receive UPDP data from interface engine 610 and process the UPDP data to integrate the received UPDP data in a manner enabling display of the UPDP data to the user and control of the UPDPI data by the user. The integration of the UPDP data may include integration of common and/or different types of UPDP data received from common and/or different types of environments. For example, integration of the UPDP data may include integration of common types of financial data received from two different financial institutions (e.g., where the information is formatted differently by the two institutions), different types of energy consumption information received from two different types of energy providers (e.g., gas and electric companies), common types of social networking data received from common types of social networking sites, different types of network usage information received from common types of network providers, and the like. The integration management engine 620 is configured to provide the integrated UPDP data to the data analysis engine 630.

The data analysis engine 630 is configured to receive the integrated UPDP data from integration management engine 620 and analyze the integrated UPDP data in a manner enabling display of the UPDP data to the user and control of the UPDP data by the user. For example, analysis of the integrated UPDP data may include one or more of data warehousing, indexing amended data, master data management (MDM) for ensuring quality of the UPDP data, and the like, as well as various combinations thereof. The data analysis engine 630 is configured to provide the analyzed UPDP data to the information delivery engine 640.

The information delivery engine 640 is configured to receive the analyzed UPDP data from data analysis engine 630 and process the analyzed UPDP data in a manner enabling display of the UPDP data to the user and control of the UPDP data by the user. For example, processing of the analyzed UPDP data may include use of one or more of analytics, search and/or discovery mechanisms, workflow modeling functions, location-based portal capabilities, and the like, as well as various combinations thereof. The information delivery engine 640 is configured to provide the processed, analyzed UPDP data to the user interface engine 650.

The user interface engine 650 is configured to receive the processed, analyzed UPDP data from the information delivery engine 640 and present the UPDP data to the user, thereby enabling the user to view and interact with the UPDP data. The user interface engine 650 may be configured to support various capabilities via which the user can view the UPDP data and, optionally, interact with UPDP data. For example, the user interface engine 650 may support one or more of dashboard/scorecard visualization mechanisms, reporting mechanisms, search/discovery mechanisms, and the like, as well as various combinations thereof.

Although primarily depicted and described herein with respect to use of the UPDP data presentation and control engine 522 in a direction from receipt of UPDP data at user device 110 to presentation of UPDP data to the user via user device 110, it is noted that the UPDP data presentation control engine 522 also may be used to support various types of communications and functions in a direction from a user interface of user device 110 to transmission of information related to the UPDP service from user device 110 toward one or more other devices.

Returning now to FIG. 5, it is noted that user device 110 may be configured to support various other capabilities.

In one embodiment, the UPDP client module 115 of user device 110 includes or is implemented as a personal data agent application or applications, where the personal data agent application(s) may be executed by one or more processor in order to support any of the functions depicted and described herein as being supported by UPDP client module 115 of user device 110.

The UPDP Agents 152 are configured to perform various UPDP agent functions. As described herein with respect to FIG. 1, UPDP Agents 152 may be resident on UPDP Core Engine 150 and/or within environments 120 (e.g., temporarily at the time of data porting and/or more permanently). In one embodiment, a UPDP Agent 152 associated with an environment 120 may be configured to control automated porting of personal data from the environment 120 to UPDP Stores of users of the environment 120.

Figure 7:
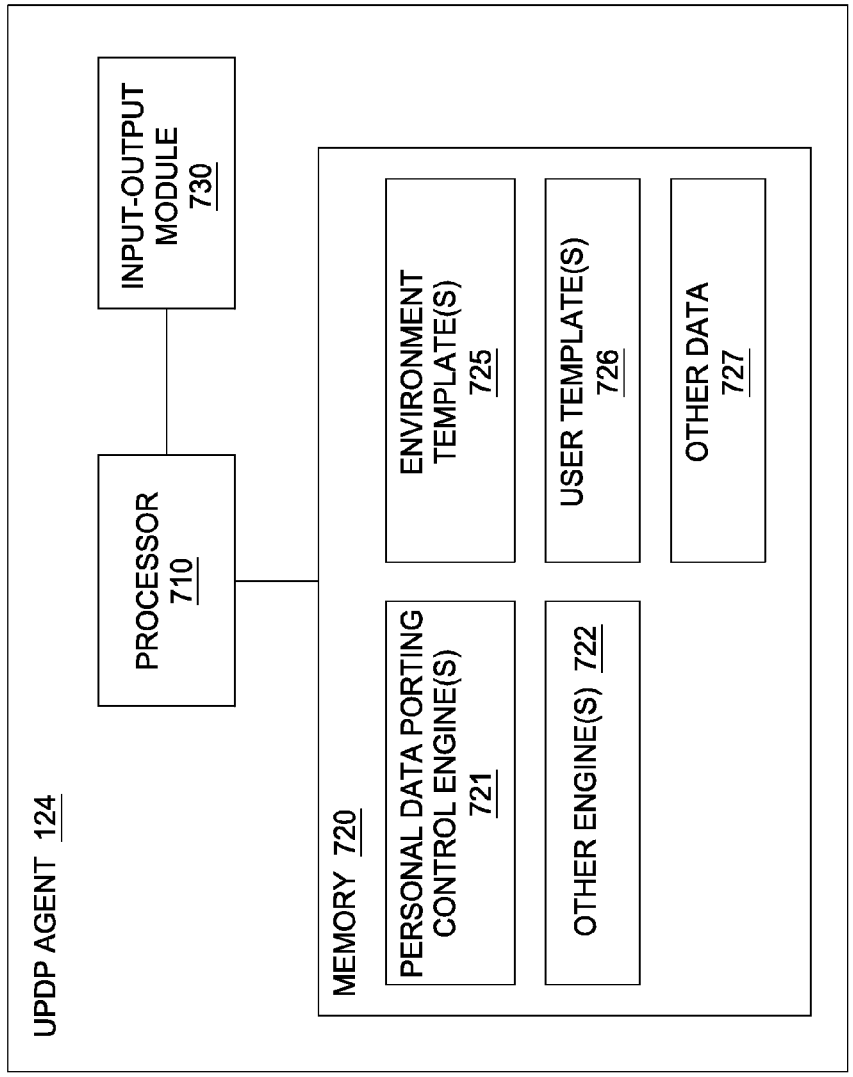
FIG. 7 depicts a high-level block diagram of an exemplary UPDP Agent for use by an environment to support universal personal data portability.

An exemplary UPDP Agent 152 is depicted and described with respect to FIG. 7.

FIG. 7 depicts a high-level block diagram of an exemplary UPDP Agent for use by an environment to support universal personal data portability.

As depicted in FIG. 7, UPDP Agent 152 includes a processor 710, a memory 720, and an input-output module 730. The processor 710 is communicatively coupled to the memory 720 and the input-output module 730. The memory 720 includes a number of engines which may be executed by processor 710 to perform various functions of the UPDP capability, including a personal data porting control engine 721 and one or more other engines 722. The memory 720 also includes information and data which may be used by the engines, including environment templates 725, user templates 726, and other data 727.

The personal data porting control engine 721 is configured to control porting of personal data of the user from the environment 120 to the UPDP Store 130 of the user. For example, personal data porting control engine 721 may monitor for trigger conditions which, when detected, trigger automated porting of personal data of the user from the environment 120 to the UPDP Store 130 of the user. For example, personal data porting control engine 721 may initiate retrieval of personal data from the environment 120 and sending of the personal data to the UPDP Store 130 of the user (e.g., at predetermined times, in response to detection of trigger events or conditions, and the like. The personal data porting control engine 721 may be configured to provide any other functions of UPDP Agents 152 as depicted and described herein. The other control engine(s) 722 may provide any other functions depicted and described herein as being supported by UPDP Agent 152.

The environment templates 725 include templates configured for use by the entity which controls the environment 120 for use in configuring the UPDP Agent 152 in accordance with the environment 120 (e.g., with requirements and/or preferences of the entity which controls the environment 120). The environment templates 725 may specify rules regarding porting of personal data from the environment 120 to UPDP Stores of users (e.g., types of personal data which the entity permits to be ported, types of data which the entity prohibits from being ported, and the like). The environment templates 725 may be retrieved by the entity which controls the environment 120, configured by the entity which controls the environment 120, and stored at the UPDP Agent 152 for use by personal data porting control engine 721 in controlling porting of personal data for the user. It is noted that the environment templates 725 may be used by the UPDP Agent 152 to performing porting of personal data and/or may be processed by UPDP Core Engine 150 to configure one or more UPDP Agents 152 to be able to performing porting of personal data.

The user templates 726 include templates configured for use by the user of the user device 110 for use in configuring the UPDP Agent 152 in accordance with the requirements and/or preferences of the user for the associated environment(s) 120 for which the UPDP Agent 152 is intended to be used. The user templates 726 may be retrieved by the user, configured by the user, and stored at the UPDP Agent 152 for use by personal data porting control engine 721 in controlling porting of personal data for the user. It is noted that the user templates 726 may be used by the UPDP Agent 152 to performing porting of personal data and/or may be processed by UPDP Core Engine 150 to configure one or more UPDP Agents 152 to be able to performing porting of personal data.

The UPDP Agent 152 associated with an environment 120 may be configured by the UPDP service provider which operates the UPDP Core Engine 150, by the entity responsible for the environment 120 using various configuration tools which may be provided to the entity from UPDP Core Engine 150, by one or more third-party providers (e.g., template providers, API providers, and the like) using various configuration tools which may be provided to the entity from UPDP Core Engine 150, and the like, as well as various combinations thereof.

Although primarily depicted and described herein with respect to an embodiment in which a single UPDP Agent 152 is associated with a specific environment, it is noted that any suitable number of UPDP Agents 152 may be associated with all and/or part of one or more environments 120. The UPDP Core Engine 150 is configured to perform various functions in support of the UPDP capability.

In one embodiment, UPDP Core Engine 150 may be configured to support functions for enabling users to use the UPDP service (e.g., supporting user registration for the users, maintaining user profiles for users, providing configuration/control mechanisms for use by users in configuring and controlling aspects of automated porting of personal data, providing configuration/control mechanisms for use by users in configuring and controlling aspects of retrieval and presentation of UPDP data 123 from the UPDP Store 130 of the user, and the like, as well as various combinations thereof).

In one embodiment, UPDP Core Engine 150 may be configured to support functions for enabling various entities associated with environments 120 to use the UPDP service (e.g., supporting entity registration, providing configuration/control mechanisms for use by the entities in configuring agents and/or APIs which control automated porting of personal data from the environments 120 to UPDP Stores of users, and the like, as well as various combinations thereof).

In one embodiment, UPDP Core Engine 150 may be configured to include one or more of the following: UPDP base software, one or more standards-based formatting agents, one or more XML translators, one or more security agents, one or more encryption/decryption capabilities, one or more network-based trusted identity functions, one or more UPDP adapter handlers, one or more UPDP agent handlers, one or more UPDP API handlers, one or more analytics functions, one or more search and/or discovery functions, one or more network environment navigators, one or more database navigators, one or more application aware agents, one or more application network intelligence functions, one or more communication protocol handlers, one or more brokering agents, one or more data organizers, and one or more profile/privacy filters.

For example, UPDP Core Engine 150 may be configured to support various related functions.

The UPDP Core Engine 150 may be implemented as a centralized management system, using a cloud-based implementation, and the like. An exemplary implementation of UPDP Core Engine 150 as a centralized management system is depicted and described with respect to FIGS. 8A and 8B. An exemplary cloud-based implementation of UPDP Core Engine 150 is depicted and described with respect to FIGS. 9 and 10.

Figure 8A:
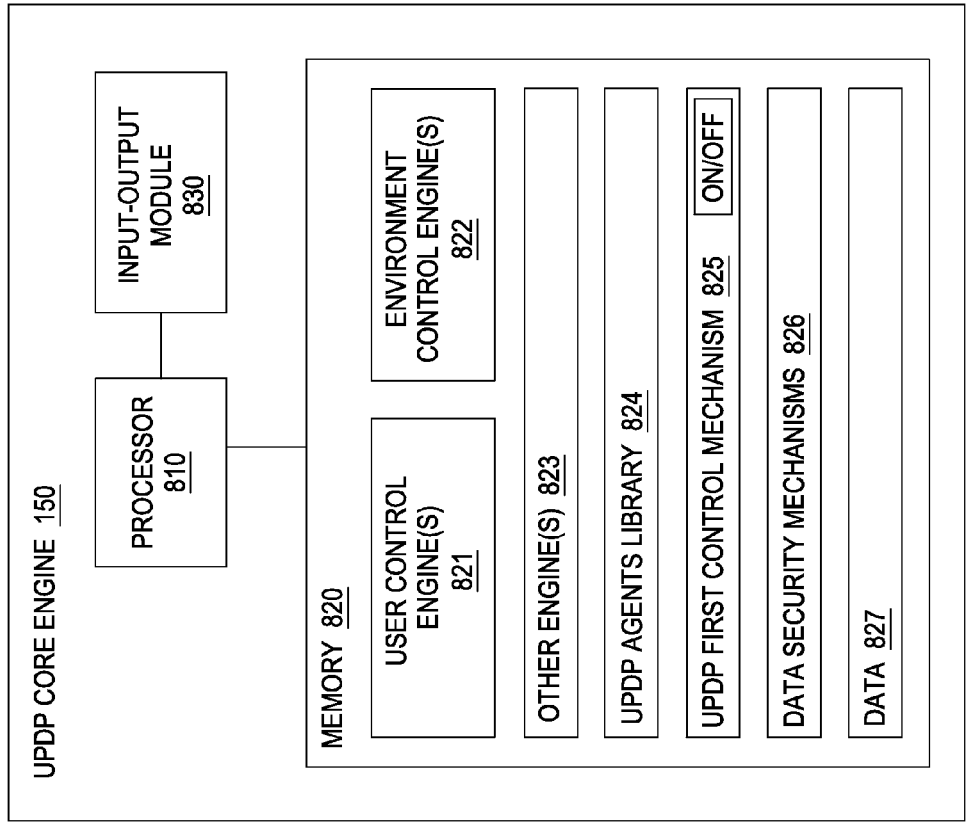
FIGS. 8A and 8B depict a high-level block diagram of an exemplary UPDP Core Engine implemented as a management system.
Figure 8B:
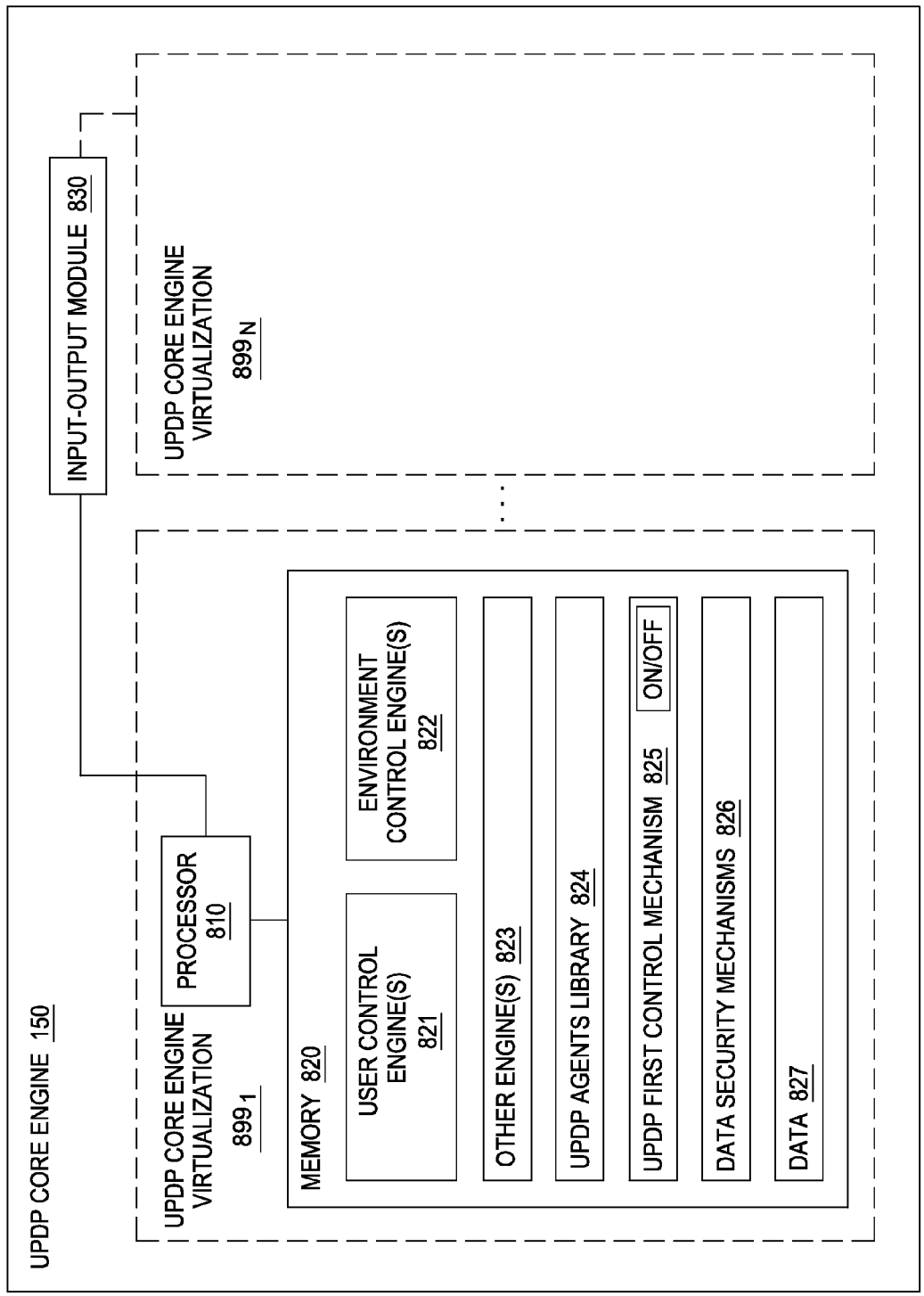

FIGS. 8A and 8B depict a high-level block diagram of an exemplary UPDP Core Engine implemented as a management system.

As depicted in FIG. 8A, UPDP Core Engine 150 includes a processor 810, a memory 820, and an input-output module 830. The processor 810 is communicatively coupled to the memory 820 and the input-output module 830. The memory 820 includes a number of elements configured to support various functions of the UPDP capability. The input-output module 830 supports communication to and from UPDP Core Engine 150.

The memory 820 includes a number of engines which may be executed by processor 810 to perform various functions of the UPDP capability, including a user control engine 821, an environment control engine 822, and one or more other engines 823.

The user control engine 821 is configured to support functions for enabling users to use the UPDP service (e.g., supporting user registration, maintaining user profiles, providing configuration/control mechanisms for use by users in configuring aspects of automated porting of personal data, and the like, as well as various combinations thereof).

The environment control engine 822 is configured to support functions for enabling various entities associated with environments 120 to use the UPDP service (e.g., supporting entity registration, maintaining entity profiles, providing configuration/control mechanisms for use by the entities in configuring agents and/or APIs which control automated porting of personal data from the environments 120 to UPDP Stores of users, and the like, as well as various combinations thereof).

The other control engine(s) 823 may support various other functions which may be provided by UPDP Core Engine 150 in support of the UPDP capability.

The memory 820 includes a UPDP Agents Library 824. The UPDP Agents Library 824 includes the UPDP Agents 152 for one or more users of the UPDP capability. The UPDP Agents 152 may be created and stored in the UPDP Agents Library 824, accessed from the UPDP Agents Library 824 for updating, accessed from the UPDP Agents Library 824 to be executed for initiating porting of personal data 122 from environments 120, and the like.

The memory 820 includes a UPDP First Control Mechanism 825. This enables UPDP Core Engine 150 to control porting of personal data of users to UPDP Stores of the users based on UPDP First Control Mechanism settings maintained for the users at the UPDP Core Engine 150. The UPDP First Control Mechanism 825 may be set on a per-user basis and/or for one or more groups of users. For purposes of clarity, the UPDP First Control Mechanism 825 and is primarily described within the context of the case of an individual user. For example, the setting of the UPDP First Control Mechanism 525 for the user at user device 110 is communicated from the user device 110 to UPDP Core Engine 150 such that the UPDP First Control Mechanism 825 may be set for the user at the UPDP Core Engine 150 in the manner indicated by the user. As described herein, the UPDP First Control Mechanism 825 controls whether personal data 122 of the user is ported to the UPDP Store 130 of the user before the personal data 122 is provided to the environment 120 for which the personal data 122 is intended or whether personal data 122 of the user is provided to the environment 120 for which the personal data 122 is intended and then subsequently ported from the environment 120 to the UPDP Store 130 of the user. For example, this is illustrated as an OFF/ON toggle capability in which (1) when the mechanism is set to OFF, proactive porting of personal data 122 to UPDP Store 130 is not active (i.e., personal data 122 is provided to the appropriate environments 120 first and then ported from the environments 120 to the UPDP Store 130 of the user in accordance with the associated UPDP Agents 152), and (2) when the mechanism is set to ON, proactive porting of personal data 122 to UPDP Store 130 is active (i.e., personal data 122 is provided to the UPDP Store 130 first and is then provided to the appropriate environment 120 for storage as personal data 122 within the environment 120). The UPDP First Control Mechanism 525 may be configured such that OFF is the default setting or ON is the default setting. It will be appreciated that, although depicted and described as an OFF/ON toggle capability (for purposes of clarity), a lower granularity of control may be provided (e.g., setting per data type, per environment, and the like, as well as various combinations thereof).

The memory 820 includes a Data Security Mechanism 826. The Data Security Mechanisms 826 support encryption/decryption of data related to the UPDP capability.

The memory 820 includes data 827 related to any of the various elements of the Core Engine 150.

As depicted in FIG. 8B, UPDP Core Engine 150 may be virtualized on a per-user basis. The UPDP Core Engine 150 of FIG. 8B is depicted as including the same elements as the UPDP Core Engine 150 of FIG. 8A, however, the UPDP Core Engine 150 of FIG. 8B also is configured to provide a plurality of UPDP Core Engine Virtualizations $899_1$-$899_N$ for N different users which may use UPDP Core Engine 150 when using the UPDP service. In this case, each of the N users for which virtualizations are provided is allocated some portion of the processing resources (e.g., processor 810) and some portion of the memory resources (e.g., memory 820) of the UPDP Core Engine 150 for use by the user in configuring, controlling, and using various features of the UPDP service. For the UPDP Core Engine Virtualization $899_1$, for example, various elements specific to the associated user are available within a portion of memory 820 that is dedicated for use by that user (illustratively, user control engine(s) 821, an environment control engine(s) 822, other engine(s) 823, UPDP Agents Library 824, UPDP First Control Mechanism 825, Data Security Mechanisms 826, and data 827) and a portion of processor 810 that is dedicated for use by the user may utilize such elements of the user to support various aspects of the UPDP service for the user. It will be appreciated that UPDP Core Engine Virtualizations $899_2$ through $899_N$ may include similar elements appropriately configured for the users of those UPDP Core Engine Virtualizations $899_2$ through $899_N$, respectively.

Although primarily depicted and described with respect to an embodiment in which the UPDP Core Engine 150 is implemented as a standalone system, it is noted that the various functions depicted and described herein as being supported by the UPDP Core Engine 150 may be distributed across any suitable number of devices in any suitable manner. Furthermore, as noted above, in one embodiment the UPDP Core Engine 150 may be implemented using a cloud-based architecture.

Figure 9:
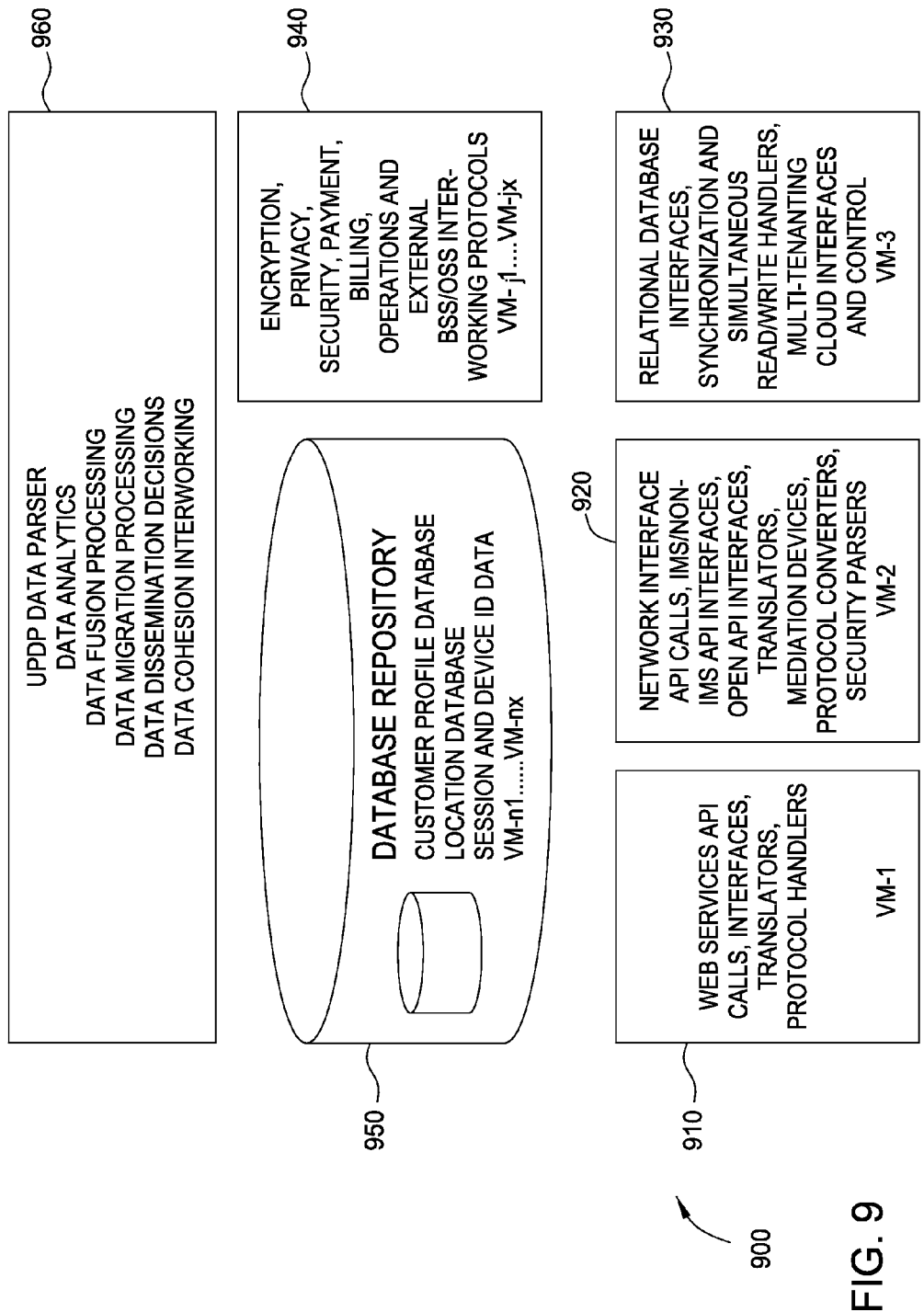
FIG. 9 depicts a high-level block diagram of an exemplary cloud-based implementation of a UPDP Core Engine.

FIG. 9 depicts a high-level block diagram of an exemplary cloud-based implementation of a UPDP Core Engine.

As depicted in FIG. 9, exemplary cloud-based implementation 900 of UPDP Core Engine 150 uses a plurality of sets of virtual machines (VMs) to provide various functions of UPDP Core Engine 150.

The exemplary cloud-based implementation 900 includes a VM 910 (denoted as VM-1) which is configured to support Web services API calls, interfaces, translators, and protocol handlers. It is noted that VM-1 also may be configured to support various other related functions.

The exemplary cloud-based implementation 900 includes a VM 920 (denoted as VM-2) which is configured to support network interface API calls, IMS and non-IMS API interfaces, OpenAPI interfaces, translators, mediation devices, protocol converters, and security parsers. It is noted that VM-2 also may be configured to support various other related functions.

The exemplary cloud-based implementation 900 includes a VM 930 (denoted as VM-3) which is configured to support relational database interfaces, synchronization and simultaneous read/write handlers, and multi-tenanting cloud interfaces and control. It is noted that VM-3 also may be configured to support various other related functions.

The exemplary cloud-based implementation 900 includes a set of VMs 940 (denoted as VM-j1 through VM-jx) which are configured to support encryption and decryption functions, privacy functions, security functions, billing functions, payment functions, and operations and external Business Support System (BSS)/Operations Support System (OSS) interworking protocols. It is noted that VM-j1 through VM-jx also may be configured to support various other related functions.

The exemplary cloud-based implementation 900 includes a set of VMs 950 (denoted as VM-n1 through VM-nx) which are configured to provide a database repository. The database repository may support a customer profile database, a location database, device identifier and session data, and the like. It is noted that VM-n1 through VM-nx also may be configured to store various other types of information related to the UPDP service (e.g., templates, UPDP Agents Libraries, and the like).

The exemplary cloud-based implementation 900 includes a set of VMs 960 (denoted as VM-p1 through VM-px) which are configured to support one or more UPDP data parsers, data analytics, data fusion processing, data migration processing, data dissemination decisions, data cohesion interworking. It is noted that VM-p1 through VM-px also may be configured to support various other related functions.

Although exemplary cloud-based implementation 900 is depicted and described with respect to a specific distribution of the functions of UPDP Core Engine 150 across specific numbers and arrangements of VMs, it is noted that the functions of UPDP Core Engine 150 may be distributed across VMs in any other suitable manner (e.g. using less or more VMs, using different arrangements of VMs, and the like, as well as various combinations thereof).

Although omitted for purposes of clarity, it is noted that exemplary cloud-based implementation 900 may utilize various other features of cloud architectures (e.g., use of multi-tenancy cloud architectures, use of geographic redundancy control, and the like as well as various combinations thereof).

Figure 10:
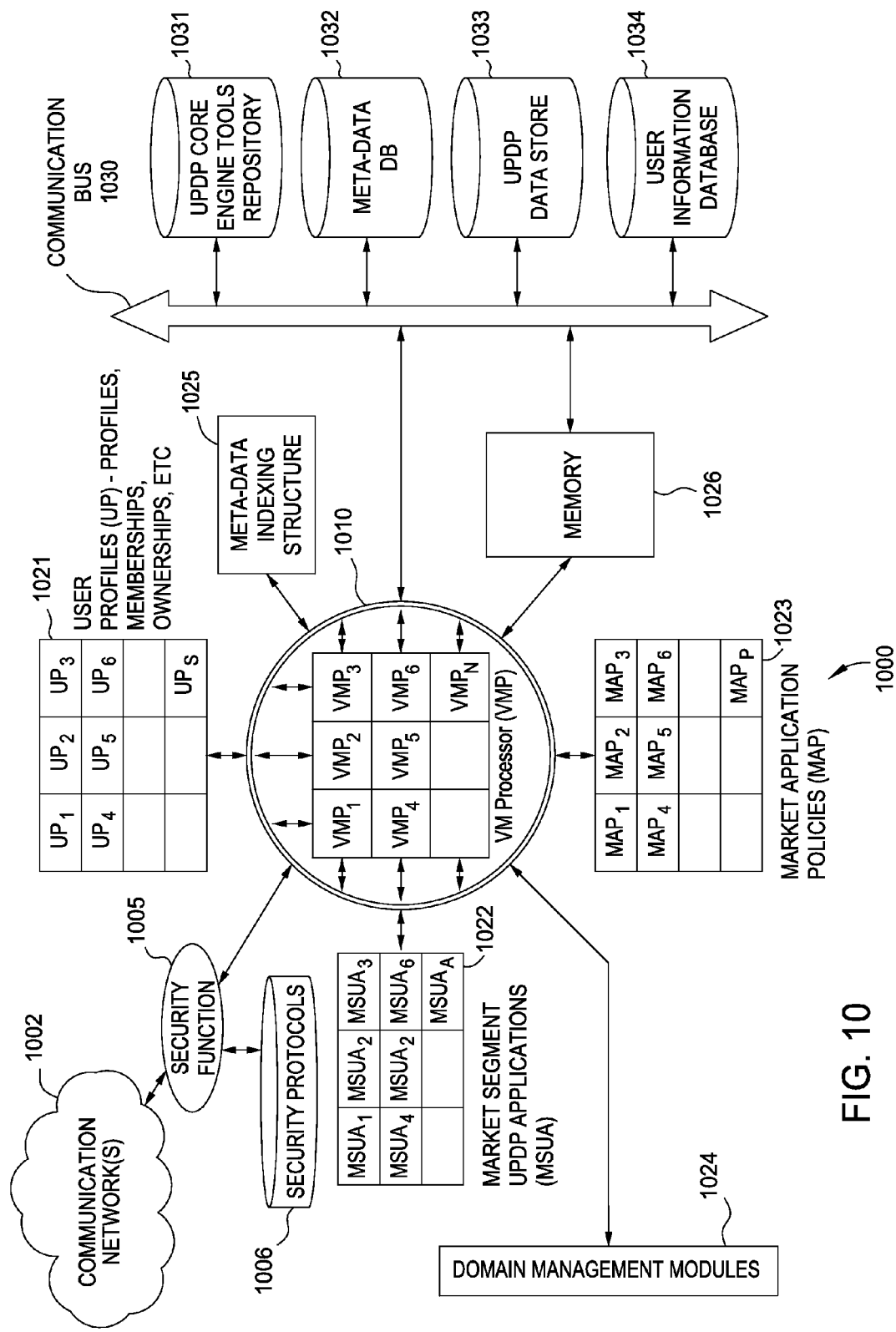
FIG. 10 depicts a high-level block diagram of an exemplary cloud-based implementation of a UPDP Core Engine for illustrating processor and memory management in a cloud-based implementation of a UPDP Core Engine.

FIG. 10 depicts a high-level block diagram of an exemplary cloud-based implementation of a UPDP Core Engine for illustrating processor and memory management in a cloud-based implementation of a UPDP Core Engine.

The exemplary cloud-based implementation 1000 of UPDP Core Engine 150 includes a set of Virtual Machine (VM) Processors (VMPs) 1010 (denoted as $VMP_1$-$VMP_n$) configured to provide various functions of UPDP Core Engine 150.

The set of VMPs 1010 is configured to communicate with one or more external communication networks 1002 (e.g., communication network 140 which may include the Internet and/or one or more Intranets). The communication between the set of VMPs 1010 and the external communication networks is secured by Security Function 1005 which is configured to use one or more Security Protocols 1006 to secure inbound and outbound communications.

The set of VMPs 1010 is configured to manage, access, and utilize various types of applications, structures, data, and the like.

For example, the set of VMPs 1010 is configured to manage, access, and utilize a set of User Profiles (UPs) 1021 (denoted as $UP_1$-$UP_U$) which include User Profiles associated with users of the UPDP service. For example, the user profile information of a given UP 1021 of a user may include user account information, UPDP ownership information, UPDP membership information, UPDP Agents associated with the user, and the like, as well as various combinations thereof.

For example, the set of VMPs 1010 is configured to manage, access, and utilize a set of Market Segment UPDP Applications (MSUAs) 1022 (denoted as $MSUA_1$-$MSUA_A$) for various market segments for which the UPDP service may be used (e.g., markets such as the telecommunications services market, the utilities services market, the financial services market, the medical services market, the entertainment market, the public services market, and the like). For example, for a given MSUA 1022, the MSUA 1022 may include one or more UPDP applications which may be supported for that market segment.

For example, the set of VMPs 1010 is configured to manage, access, and utilize a set of Market Application Policies (MAPs) 1023 (denoted as $MAP_1$-$MAP_P$) which include Market Application Policies associated with MSUAs 1022 of various types of markets. For example, for a given MAP 1023, the MAP 1023 may include one or more application policies associated with one or more UPDP applications of MSUA(s) 1022 corresponding to the associated market segment.

For example, the set of VMPs 1010 is configured to manage, access, and utilize one or more Domain Management Modules 1024. The VMPs 1010 may be dynamically assigned to manage one or more of Security Function 1005, UPs 1021, MSUAs 1022, and MAPs 1023 using the relevant functionality of the Domain Management Modules 1024.

For example, the set of VMPs 1010 is configured to manage, access, and utilize one or more Meta-Data Indexing Structures 1025. The Meta-Data Indexing Structures 1025 may be generated from all of the information and UPDP transactions, including information and UPDP transactions generated by the user via the user device 110 (or any other suitable user device) and/or by the UPDP Agents 152.

For example, the set of VMPs 1010 is configured to manage, access, and utilize other memory 1026 which may be utilized by UPDP Core Engine 150.

The set of VMPs 1010 is configured to manage, access, and utilize various types of programs and data via a communication bus 1030. For example, the set of VMPs 1010 may be configured to manage, access, and utilize programs and/or data from a UPDP Core Engine Tools Repository 1031, a Meta-Data Database 1032, a UPDP Data Store 1033, and a User Information Database 1034.

As described herein, UPDP system 100 is configured to support automatic porting of personal data of a user to a UPDP sStore of the user. In one embodiment, automatic porting of personal data of a user may be provided by using templates to control configuration of UPDP system 100 to support automatic porting of personal data to the UPDP Store of the user. The templates may include templates for use by users, templates for use by entities of the environments 120, and the like, as well as various combinations thereof. The use of such templates is depicted and described herein at least with respect to FIGS. 5, 7, and 9-10.

In one embodiment, one or more templates may be made available to the user for use by the user in configuring various aspects of automatic porting of personal data to the UPDP Store 130 of the user. The templates may be made available to the user from the environments 120 (e.g., for the case in which a template enables the user to configure automatic data porting for that particular environment 120), UPDP Core Engine 150 (e.g., for the case in which a template enables the user to configure automatic data porting across multiple environments 120), and the like, as well as various combinations thereof.

In one embodiment, a template may be configured to enable the user to control automatic porting of personal data of a particular environment 120. The user may use a template to specify which personal data of the user that is in control of the entity is automatically ported to the UPDP Store 130 of the user. The template may be configured to enable the user to specify which personal data is automatically ported to the UPDP Store 130 at any suitable granularity. For example, where a particular entity associated with an environment 120 supports multiple services (e.g., web searching, email, social networking, and the like), the template may be configured to enable the user to specify which data is ported to the UPDP Store 130 of the user on a per-service basis (e.g., automatically port all personal data from the email service, but do not port any personal data from the social networking service), on a per data type basis within and/or across services (e.g., automatically port all sent e-mails but do not port received e-mails for the email service, automatically port all incoming communications from the e-mail and social networking services but do not port any outgoing communications from the e-mail or social networking services, and the like), and the like, as well as various combinations thereof.

In one embodiment, a template may be configured to enable the user to control automatic porting of personal data of multiple environments 120. The user may use a template to specify which types of personal data of the user, which may be in control of one or more entities of one or more environments 120, is automatically ported to the UPDP Store 130 of the user. The template may be configured to enable the user to specify which personal data is automatically ported to the UPDP Store 130 at any suitable granularity. For example, the template may be configured to enable the user to specify porting of personal data on a per-environment basis (e.g., automatically port all personal data from operator environment $120_{O1}$ and provider environment $120_{P2}$, but not from any other environments 120). For example, the template may be configured to enable the user to specify porting of personal data on a per data type basis (e.g., port all login and password information from all environments 120, port all incoming communications from all environments 120, port all financial information from all environments 120, port all energy usage information from all environments 120, and the like). For example, the template may be configured to enable the user to specify porting of personal data using a combination of such granularities.

The configuration of a template by a user may result in various configuration actions. For example, where a user submits a completed template, the template may be stored by UPDP Core Engine 150 (e.g., as part of user profile information of the user), information from the template may be used by UPDP Core Engine 150 to configure one or more UPDP Agents 152 maintained at the UPDP Core Engine 150 for the user, information from the template may be provided to one or more environments 120 for use by the environment(s) in configuring one or more UPDP Agents 152 to perform automated porting of personal data for the user in accordance with the information specified in the template (and/or may be processed to generate configuration information which is then provided to one or more environments 120 for use by the environment(s) 120 in configuring the UPDP Agents 152 to perform automated porting of personal data in accordance with the information specified in the template), and the like, as well as various combinations thereof.

In one embodiment, one or more templates may be made available to an environment 120 for use by the entity that controls that environment 120 in configuring various aspects of automatic porting of personal data of users of the environment 120. The templates may be made available to the user from UPDP Core Engine 150, from one or more systems of the environment 120, from one or more third-party template providers, and the like, as well as various combinations thereof. In one embodiment, a template may be configured by the entity that controls that environment 120 to enable the entity to control the types of personal data permitted to be ported from the environment 120 for the users. For example, where the environment 120 is controlled by a social networking service, the template may be configured such that user account information (e.g., home address, phone number, and the like) is not permitted to be ported outside of the environment 120, but other information (e.g., user posts, messages to users, and the like) is permitted to be ported outside of the environment 120. For example, where the environment 120 is controlled by a bank, the template may be configured such that account numbers are not permitted to be ported outside of the environment 120, but other information (e.g., account balance information, account transaction history, and the like) is permitted to be ported outside of the environment 120.

The configuration of a template by an entity of an environment 120 may result in various configuration actions. For example, upon completion of the template, the template may be stored by UPDP Core Engine 150 (e.g., as part of a profile maintained for the environment 120), information from the template may be used to configure the one or more UPDP Agents 152 for that environment 120 to perform automated porting of personal data in accordance with information specified in the template (e.g., one or more UPDP Agents 152 maintained at UPDP Core Engine 150, one or more UPDP Agents maintained within the environment 120, and so forth), and the like, as well as various combinations thereof.

Although primarily depicted and described with respect to use of templates to control automated porting of personal data, it will be appreciated that any other suitable types of control mechanisms may be used to control automated porting of personal data.

As described herein, UPDP system 100 is configured to support porting of personal data of a user to a UPDP Store of the user. This enables various other capabilities and services to be supported for the user, some examples of which follow.

In one embodiment, UPDP system 100 is configured to support a personal data transfer capability. In this embodiment, when the user switches service providers from a first service provider having a first service provider environment to a second service provider having a second service provider environment, personal data of the user relevant to the relationship of the user with the first service provider is transferred from the UPDP Store of the user to the second service provider environment of the second service provider. The personal data transfer capability may be better understood by way of reference to FIG. 11.

Figure 11:
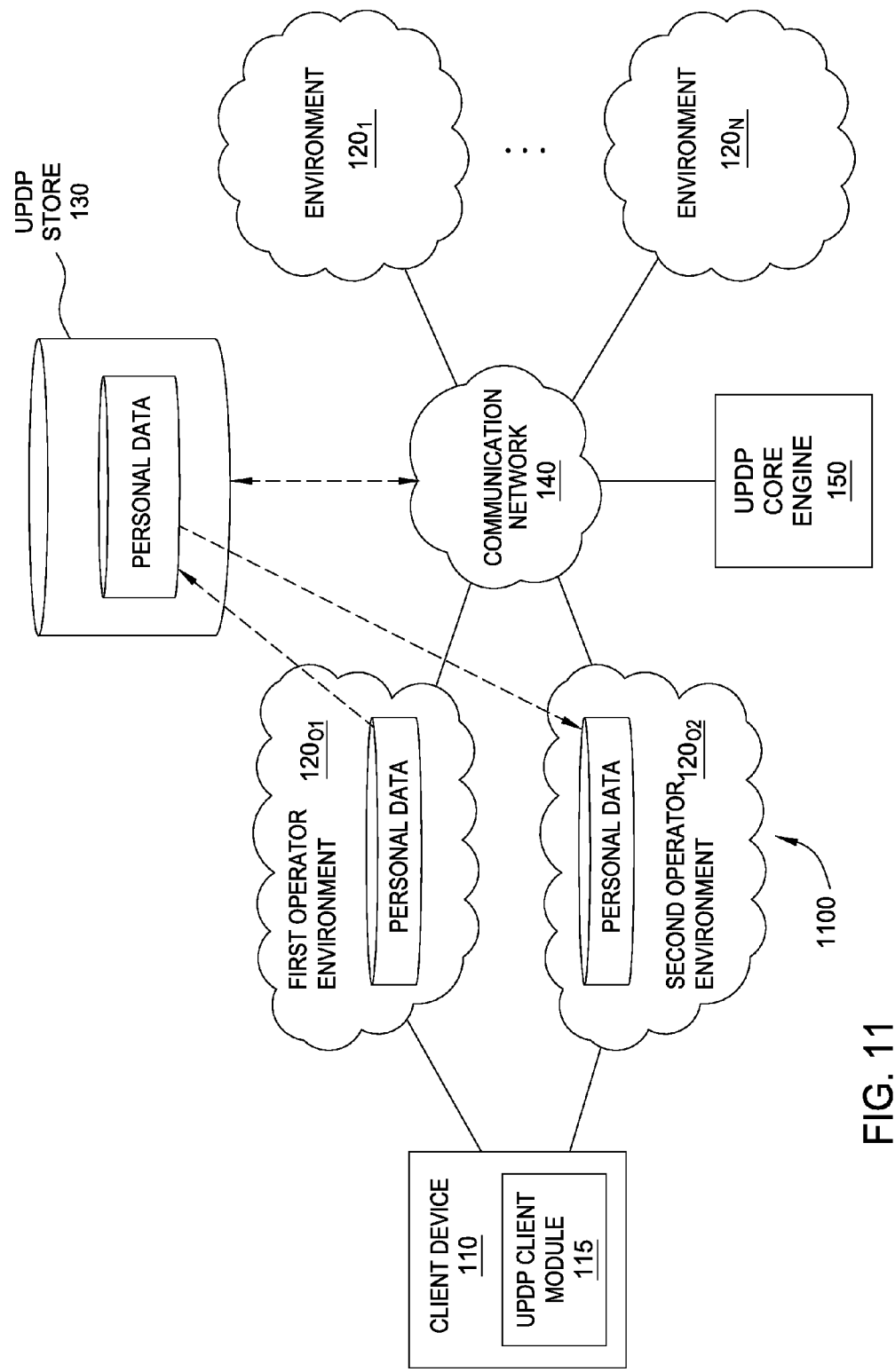
FIG. 11 depicts a high-level block diagram of an exemplary system illustrating use of the personal data transfer capability to transfer personal data between network operator environments.

FIG. 11 depicts a high-level block diagram of an exemplary system illustrating use of the personal data transfer capability to transfer personal data between network operator environments.

As depicted in FIG. 11, exemplary system 1100 is similar to UPDP system 100 of FIG. 1.

The user associated with user device 110 first registers with a first operator (e.g., a telecomm company, a cable provider, and the like), having a first operator environment $120_{O1}$, from which the user receives Internet access. The first operator collects personal data of the user while the user uses the various services of the first operator. As depicted and described herein, the personal data of the user that is available from the first operator environment $120_{O1}$ of the first operator is automatically ported to the UPDP Store 130 of the user.

The user associated with user device 110, at a later point in time, decides to switch from the first operator to a second operator having a second operator environment $120_{O2}$, from which the user will receive Internet access going forward. The user cancels the service from the first operator and registers with the second operator (e.g., for switching from one telecomm company to another telecomm company, for switching from a cable provider to a telecom company, or for any other reason).

In the absence of the UPDP capability depicted and described herein, the personal data of the user that was collected and maintained in the first operator environment $120_{O1}$ of the first operator would be lost to the user when the user cancels service from the first operator and, thus, could not be provided to the second operator. The UPDP capability, however, by enabling automatic porting of the personal data of the user from first operator environment $120_{O1}$ to UPDP Store 130 ensures that the personal data of the user that was collected and maintained in the first operator environment $120_{O1}$ of the first operator is not lost to the user when the user cancels service from the first operator. Furthermore, the personal data transfer capability enables the personal data of the user that was collected and maintained in the first operator environment $120_{O1}$ of the first operator to be transferred (e.g., automatically in response to detecting that the user registers with the second operator or manually in response to a request of the user) from the UPDP Store 130 of the user to second operator environment $120_{O2}$ of the second operator. This enables the second operator to quickly and easily obtain personal data of the user that is or may be relevant to the relationship between the user and the second operator.

In one embodiment, UPDP system 100 is configured to support a file system and content tagging capability. In this embodiment, content items (e.g., files, media content, and the like) are tagged with content importance tags, where a content importance tag for a content item indicates the importance level of the content in the content item. The user may set the content importance tags for the content items manually. The user may mark various types of content with content importance tags (e.g., content created by the user, content reviewed by the user while browsing or consuming content, and the like). The content importance tags available to the user may include any suitable numbers and types of tags. In one example, supported content importance tags may include: "F" (the content item is importance, and is finalized and ready to be shared), "NF" (the content item is important but is not finalized and, thus, not ready to be shared), and "DC" (the content item is not important and, thus, the user does not care if the content item is shared before it is finalized). It is noted that these content importance tags are only exemplary and, thus, that fewer or more (as well as other types) of content importance tags may be used. In this embodiment, UPDP functions can be configured to automatically determine whether to transfer content items to the UPDP Store of the user based on the content importance tags of the content items set by the user. For example, in continuation of the example describing the exemplary content importance tags discussed above, the UPDP functions may be configured to automatically transfer content items marked with "F" and "DC" to the UPDP Store of the user and not to transfer content items marked with "NF" to the UPDP Store of the user. In this manner, the user may automate cloudification of content via simple setting of content importance tags.

In one embodiment, UPDP system 100 is configured to support an automated data sharing capability.

In one embodiment, the user is provided with a capability to control one or more data sharing windows or ports which enable user-controlled sharing of personal data of the user (namely, the UPDP data of the user that is stored in the UPDP Store of the user). The data sharing ports may be associated with the user in any suitable manner (e.g., by providing each account and/or sub-account of the user with one or more data sharing ports, by associating one or more data sharing ports with each of one or more content types of the UPDP data of the user, and the like, as well as various combinations thereof). The data sharing ports may be associated with the user in advance and/or in real-time. The data sharing ports may be set to a default setting of disabled such that the data sharing ports are inactive and, thus, the associated UPDP data of the user is only accessible to the user (or other owner(s) or member(s) having access privileges), thereby ensuring the privacy of the UPDP data of the user. The user can enable inactive ports for specific types of UPDP data as needed and/or desired and, similarly, can disable active ports for specific types of UPDP data as needed and/or desired.

The enabling of a data sharing port for a specific type of UPDP data thereby makes that UPDP data accessible for use by third parties, such that UPDP agents of the third parties may automatically access the UPDP data via the active data sharing port and use the available UPDP data for performing various types of functions which may be performed using such UPDP data (e.g., for targeting advertising to the user, for proposing bids for the user, and the like, as well as various combinations thereof). For example, where the user is interested in purchasing a car, the user may activate a data sharing port providing third-party access to UPDP data of the user which may be relevant to purchase of a car (e.g., size of the family, car preferences, and the like), and car manufacturers may access this UPDP data via the data sharing port and provide targeted advertisements and/or bids to the user. Similarly, for example, where the user is interested in renting a movie, the user may activate a data sharing port providing third-party access to UPDP data of the user which may be relevant to selection of a movie, and movie renting services may access this UPDP data via the data sharing port and provide targeted advertisements and/or bids to the user. It is noted that the foregoing examples are merely a few of the types of UPDP data which may be made available by a user via a data sharing port and a few of the ways in which third-parties may utilize such UPDP data.

Figure 12:
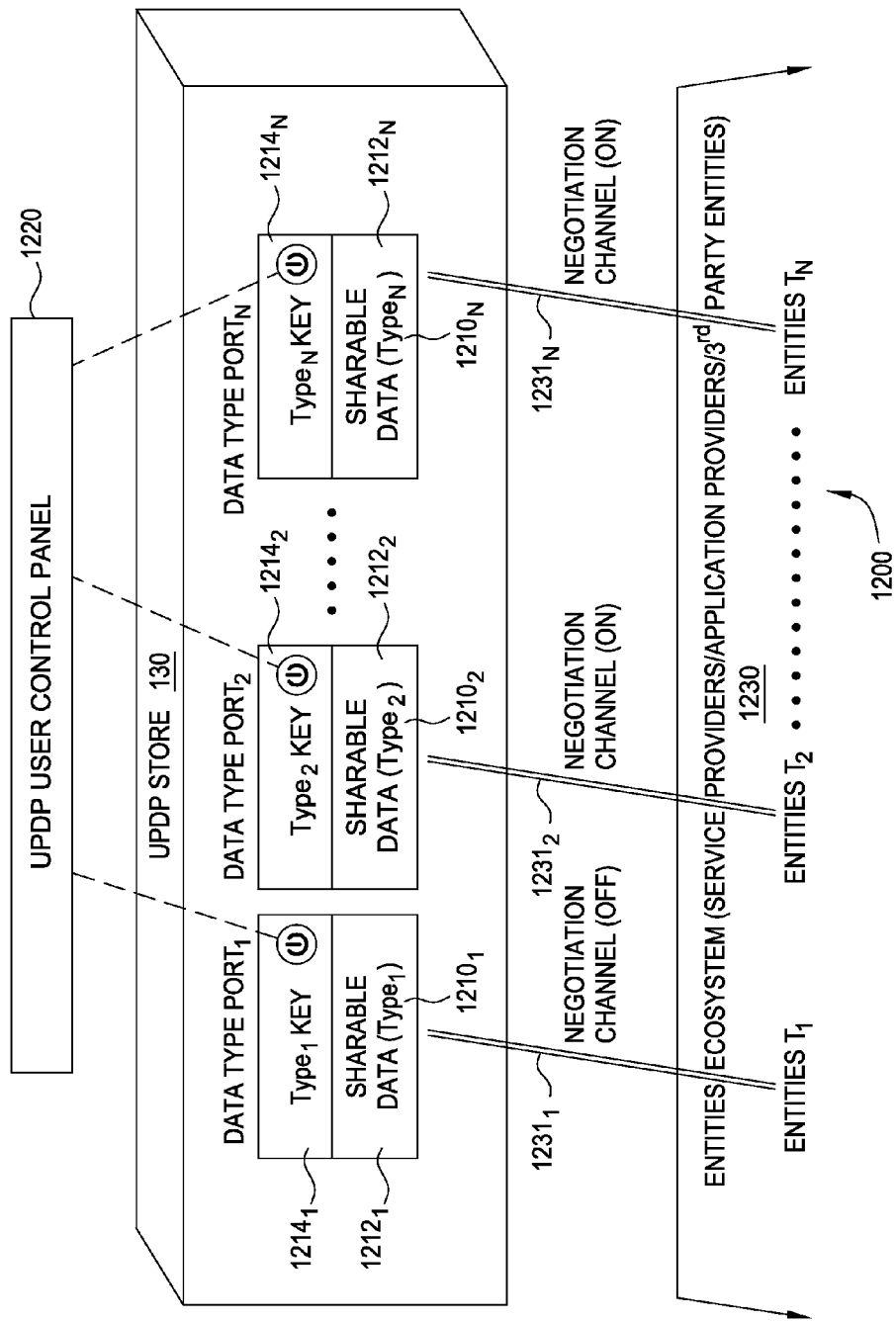
FIG. 12 depicts a high-level block diagram illustrating user-based control of data ports configured to control access to portions of UPDP data stored in a UPDP Store of a user.

An exemplary use of data sharing port is depicted and described with respect to FIG. 12.

FIG. 12 depicts a high-level block diagram illustrating user-based control of data ports configured to control access to portions of UPDP data stored in a UPDP Store of a user.

As depicted in FIG. 12, in the UPDP Store 130 of a user the UPDP data of the user is organized into data types using a plurality of data type ports $1210_1$-$1210_N$ (collectively, data type ports 1210), which are denoted as Data Type Port $T_1$ through Data Type Port $T_N$. The data type ports 1210 may be defined for any suitable data types and at any suitable granularity.

The data type ports $1210_1$-$1210_N$ include sets of sharable data $1212_1$-$1212_N$ (collectively, sharable data sets 1212), which are denoted as Sharable Data (Type$_1$) through Sharable Data (Type$_N$), respectively. The sharable data set 1212 for a given data type port 1210 includes any UPDP data of the user of that data type port 1210 that the user has indicated is sharable when access to that data type port 1210 is enabled by the user (which may include all UPDP data of the data type for that data type port 1210 or a subset of the UPDP data of the data type for that data type port 1210).

The data type ports $1210_1$-$1210_N$ have data type keys $1214_1$-$1214_N$ (collectively, data type keys 1214) associated therewith (which are denoted as Type$_1$ Key through Type$_N$ Key), respectively. The data type keys $1214_1$-$1214_N$ provide keys into respective data type ports $1210_1$-$1210_N$ via which the user of UPDP Store 130 is able to control activation and deactivation of the data type ports 1210.

As depicted in FIG. 12, a UPDP User Control Panel 1220 provides a user interface via which the user of the UPDP Store 130 may control activation and deactivation of the data type ports 1210 and, thus, activation and deactivation of the associated negotiation channels 1216 of the data type ports 1210, respectively. The data type ports 1210 are configured to be controlled individually via the UPDP User Control Panel 1220. The UPDP User Control Panel 1220 may be provided on user device 110 and/or may be accessible by the user from any user device.

As depicted in FIG. 12, activation and deactivation data type ports $1210_1$-$1210_N$ by the user via UPDP User Control Panel 1220 results in activation and deactivation of respective negotiation channels $1231_1$-$1231_N$ (collectively, negotiation channels 1231) between the sharable data $1212_1$-$1212_N$ of data type ports $1210_1$-$1210_N$ and entities of an Entities Ecosystem 1230.

The Entities Ecosystem 1230 represents entities which may be interested in accessing and using UPDP data of the UPDP Store 130 of the user. For example, Entities Ecosystem 1230 may include entities such as service providers, application providers, third-party entities, and the like, as well as various combinations thereof. In one embodiment, omitted from FIG. 12 for purposes of clarity, Entities Ecosystem 1230 may be an open world in which any entity may access sharable data 1212 of any data type port 1210. In one embodiment, as depicted in FIG. 12, Entities Ecosystem 1230 may be organized into sets of entities (illustratively, set of Entities $T_1$ through set of Entities $T_N$ where access to sharable data 1212 of data type ports 1210 is restricted to sets of entities, respectively. It is noted that combinations of such embodiments also are contemplated, e.g., such as where sharable data 1212 of two or more data type ports 1210 may be accessed by a single set of entities, where sharable data 1212 of one data type port 1210 may be accessed by two or more sets of entities, and the like (i.e., where sharable data 1212 of N data type ports 1210 may be accessed by N sets of entities, N≥1).

The negotiation channels $1231_1$-$1231_N$ between the sharable data $1212_1$-$1212_N$ of data type ports $1210_1$-$1210_N$ and an Entities Ecosystem 1230 represents the ability of entities of Entities Ecosystem 1230 to access the sharable data $1212_1$-$1212_N$ of data type ports $1210_1$-$1210_N$. When a negotiation channel 1231 of a data type port 1210 is inactive, the sharable data 1212 of that data type port 1210 is secure and is not accessible to entities of Entities Ecosystem 1230. When a negotiation channel 1231 of a data type port 1210 is active, the sharable data 1212 of that data type port 1210 is indicates as being shared by the user and is then accessible to entities of Entities Ecosystem 1230 for various purposes (e.g., for providing targeted advertising to the user of UPDP Store 130 based on the sharable data of that data type port 1210, for providing bids to the user of UPDP Store 130 based on the sharable data of that data type port 1210, and the like, as well as various combinations thereof).

In the exemplary system of FIG. 12, the negotiation channel $1231_1$ for data type port $1210_1$ is inactive (OFF) such that sharable data $1212_1$ is not accessible to the set of entities $T_1$, the negotiation channel $1231_2$ for data type port $1210_2$ is active (ON) such that sharable data $1212_2$ is accessible to the set of entities $T_2$, and the negotiation channel $1231_N$ for data type port $1210_N$ is active (ON) such that sharable data $1212_N$ is accessible to the set of entities $T_N$.

In one embodiment, UPDP system 100 is configured to support a UPDP Store bifurcation/combination capability. It is noted that bifurcation and combination of a UPDP Store(s) may be provided at any suitable granularity. For example, bifurcation may include bifurcation of a UPDP Store without partitions into a UPDP Store with partitions, bifurcation of a UPDP Store with multiple partitions into multiple UPDP Stores, and the like, as well as various combinations thereof. For example, combination may include combining of multiple UPDP Stores into a single UPDP Store, combining of multiple UPDP Stores into respective partitions of a single UPDP Store, combining of multiple partitions of one or more UPDP Stores into one or more UPDP Stores, and the like, as well as various combinations thereof.

In this embodiment, users of a UPDP Store are assigned, and ownership of the UPDP Store also is assigned. For example, a UPDP Store of a user who is the head of a family may be configured such that the user has ownership of the UPDP Store and each member of the immediate family of the user is a member of the UPDP Store. For example, a UPDP Store of a user who is an employee of a company may include (1) a first partition for work data of the user (where the company and the boss of the user share ownership of the partition, and the user and his boss are both members of the partition) and (2) a second partition for family data of the user (where the user and his or her spouse share ownership of the partition, and the user, his or her spouse, and their two kids are members of the partition). It is noted that bifurcation/combination can be used at any suitable granularity of the UPDP Store (e.g., on a UPDP Store as a whole, on a UPDP Store having two or more partitions, and the like, as well as various combinations thereof). It is further noted that bifurcation/combination may be based on any other suitable types of relationships.

In this embodiment, when ownership of a UPDP Store (or partition of a UPDP Store) changes, various functions may be performed. The change of ownership may result in bifurcation of multiple partitions of a UPDP Store into multiple UPDP Stores, combination of multiple UPDP Stores into a single UPDP Store (with or without separate partitions for the single UPDP Store), and the like, as well as various combinations thereof. The change of ownership (and, similarly, the resulting bifurcation(s)/combination(s)) may result in appropriate reevaluation of user privileges for the UPDP Store(s) (and/or partition(s) of the UPDP Store(s)) and/or appropriate revisions to access permissions for the UPDP Store(s) (and/or partition(s) of the UPDP Store(s)). The use of ownership tags for the UPDP Stores (partitions of the UPDP Stores) enables reevaluation of user permissions. The access permissions supported in this embodiment may include any suitable set of access permissions (e.g., read, write, and execute). The security levels supported in this embodiment may include any suitable number(s)/type(s) of security levels (e.g., private/public, encrypted/unencrypted, and the like, as well as various combinations thereof) and may be provided at any suitable granularity (e.g., per content item, per folder, per directory, and the like, as well as various combinations thereof).

Figure 13A:
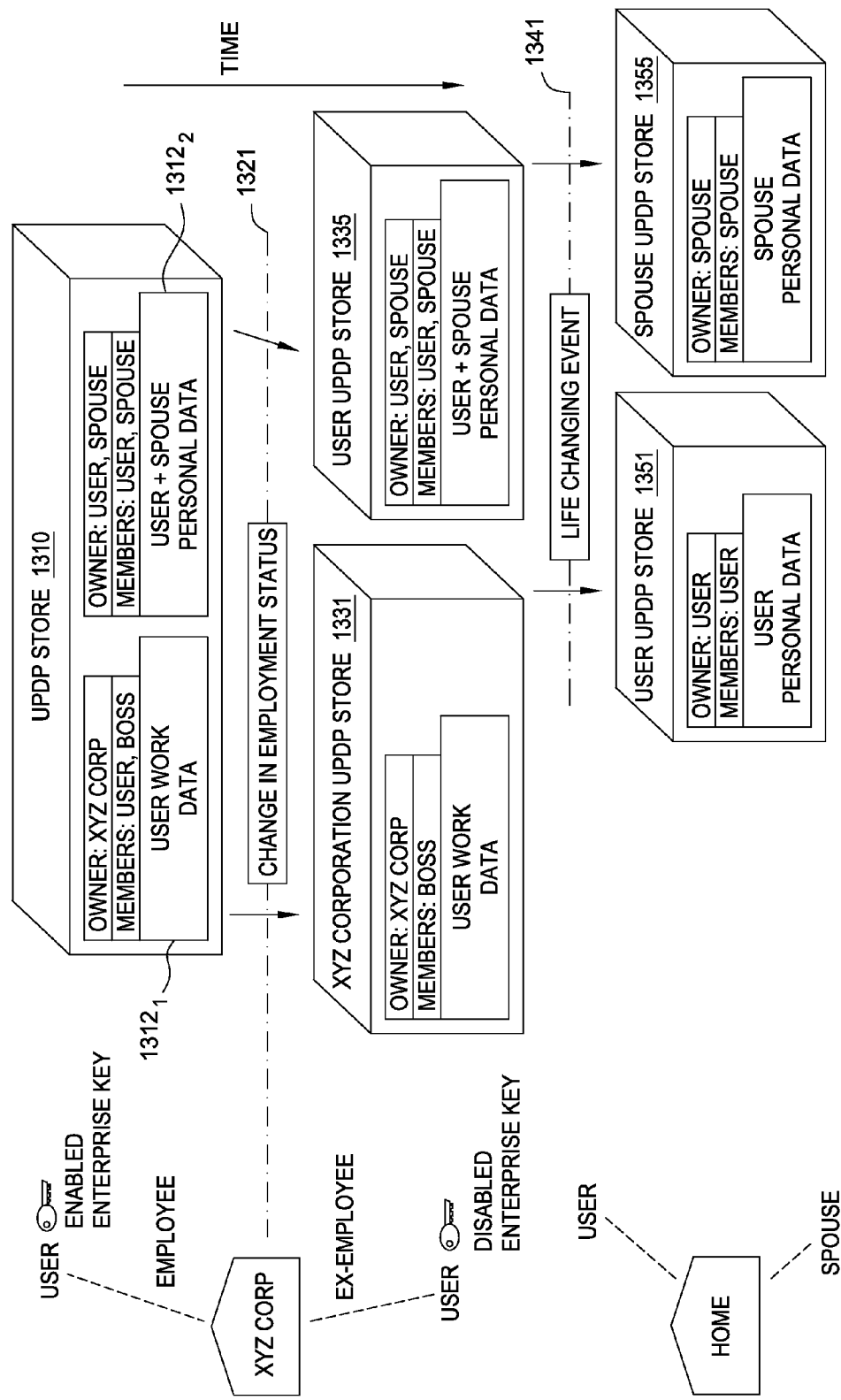
FIG. 13A depicts an exemplary UPDP Store bifurcation process in which a single UPDP Store of a user is subdivided into multiple UPDP Stores.
Figure 13B:
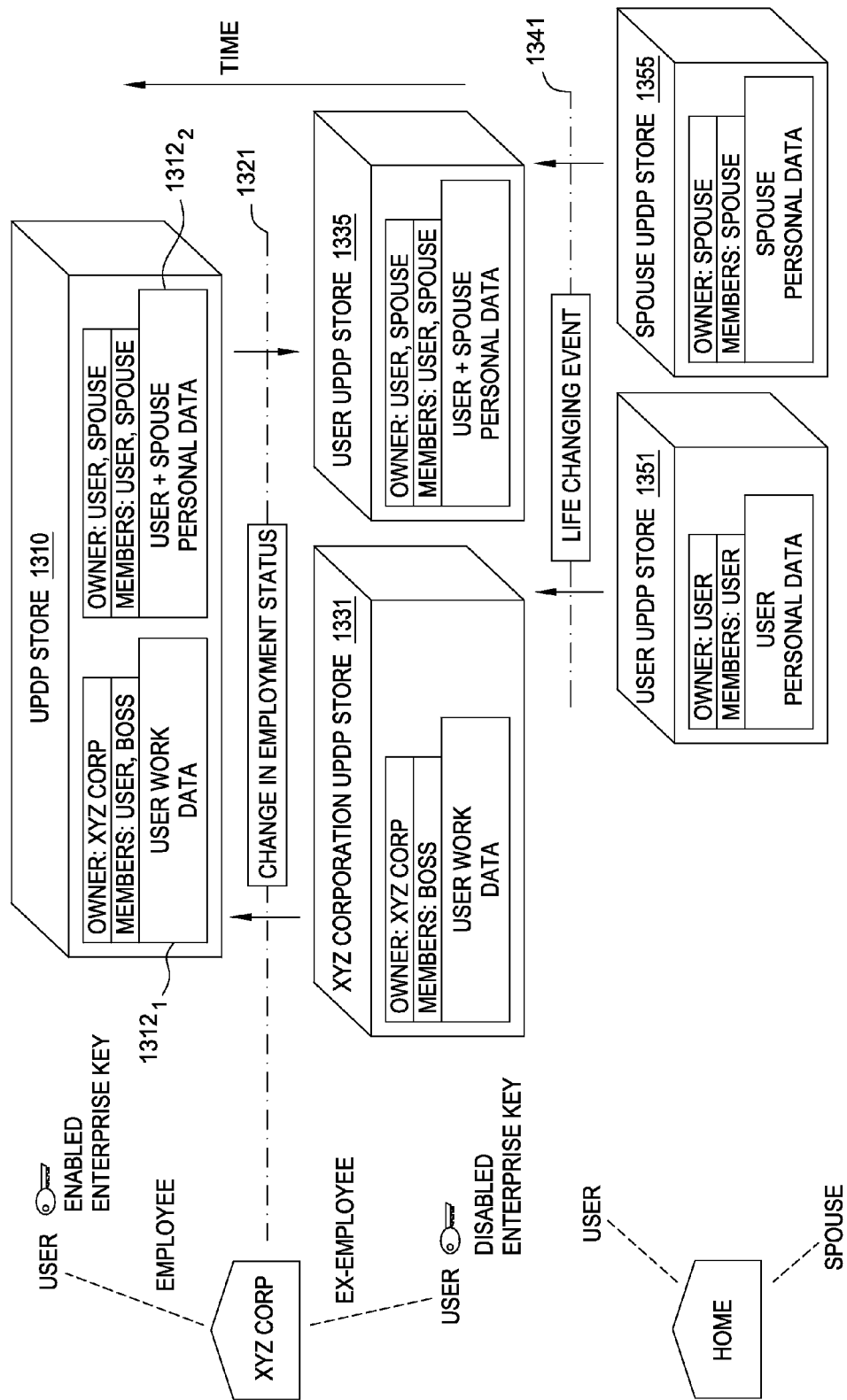
FIG. 13B depicts an exemplary UPDP Store combination process in which multiple UPDP Stores are combined to form a single UPDP Store.

The UPDP Store bifurcation/combination capability may be better understood by considering the exemplary embodiments of FIGS. 13A and 13B.

FIG. 13A depicts an exemplary UPDP Store bifurcation process in which a single UPDP Store of a user is subdivided into multiple UPDP Stores. In FIG. 13A, time proceeds from the top of the page toward the bottom of the page.

As depicted in FIG. 13A, a user has a User UPDP store 1310 which includes a first partition $1312_1$ and a second partition $1312_2$. The first partition $1312_1$ includes the work-related UPDP data of the user, where the owner of the first partition $1312_1$ is XYZ Corporation (the employer of the user) and the members of first partition $1312_1$ are the user and the boss of the user. The second partition $1312_2$ includes the personal UPDP data of the user and the spouse of the user, where the user and spouse are co-owners and co-members of the second partition $1312_2$.

As depicted in FIG. 13A, at a later point in time 1321, the user undergoes a change in employment status such that the user is no longer employed by XYZ Corporation. At that time, the enterprise key of the user is disabled by XYZ Corporation, and XYZ Corporation changes the membership of the first partition $1312_1$ such that the boss is the only member. This effectively converts the first partition $1312_1$ and second partition $1312_2$ into two separate UPDP stores including an XYZ Corporation UPDP store 1331 and a User UPDP store 1335. The XYZ Corporation UPDP store 1331 includes the work-related UPDP data of the user, where the owner of the XYZ Corporation UPDP store 1331 is XYZ Corporation and the membership of the XYZ Corporation is the boss of the user. The User UPDP store 1335 includes the personal UPDP data of the user and the spouse, where user and spouse are co-owners and co-members of User UPDP store 1335.

As depicted in FIG. 13A, at a later point in time 1331, the user and the spouse undergo a life changing event (e.g., separation or divorce). At that time, User UPDP store 1335 is divided into two separate UPDP stores including a User UPDP store 1351 and a Spouse UPDP store 1355. The User UPDP store 1335 includes the personal UPDP data of the user, where the user is the sole owner and member of the User UPDP store 1351. The Spouse UPDP store 1355 includes the personal UPDP data of the spouse, where the spouse is the sole owner and member of the Spouse UPDP store 1355.

FIG. 13B depicts an exemplary UPDP Store combination process in which multiple UPDP Stores are combined to form a single UPDP Store. FIG. 13B depicts a process opposite to that of FIG. 13A and, thus, may be better understood when considered in conjunction with FIG. 13A. In FIG. 13B, time proceeds from the bottom of the page toward the top of the page. As depicted in FIG. 13B, at time 1341, the user and spouse undergo a life changing event (e.g., dating or marriage), thereby resulting in combination of User UPDP store 1351 and Spouse UPDP store 1355 to form User UPDP store 1335. As further depicted in FIG. 13B, at time 1321, the user undergoes a change in employment status (illustrative, the user is hired by the boss to work for XYZ Corporation), thereby resulting in combination of XYZ Corporation UPDP store 1331 (e.g., provisioned for the user by XYZ Corporation upon hiring of the user) and User UPDP store 1335 to form the User UPDP store 1310, where the XYZ Corporation UPDP store 1331 and User UPDP store 1335 are managed as respective partitions of the User UPDP store 1310.

Although primarily depicted and described herein with respect to specific numbers of UPDP stores, specific numbers of partitions, specific numbers and type of events triggering partitions and combinations, specific numbers and arrangements of ownership and membership, and the like, it will be appreciated that the UPDP Store bifurcation capability may be used for other numbers of UPDP stores, other numbers of partitions, other numbers and/or types of events triggering partitions and combinations, other numbers and arrangements of ownership and membership, and the like, as well as various combinations thereof.

In one embodiment, UPDP system 100 is configured to support a real-time session monitoring capability. In this embodiment, one or more User Agents 152 may be configured to support real-time session monitoring across environments 120. The User Agent(s) 152 may be configured to monitor for the occurrence of expected and/or unexpected transactions and to act on such expected and/or unexpected transactions based on end-users needs and/or interests. The User Agent(s) 152 may be configured to consolidate various user actions (direct and/or indirect actions) occurring at various user accounts, sessions, domains, and the like, as well as various combinations thereof. The User Agent(s) may be configured to perform intelligent deduction, reasoning, and verification of user actions. The User Agent(s) 152 may be configured to flag unverifiable actions and to initiate appropriate communications regarding flagged actions (e.g., notifying the user, notifying an entity providing a service for the user, and the like, as well as various combinations thereof).

For example, a User Agent 152 may detect that the user is currently browsing the web via a home computer and that, at the same time, someone is using a credit card number of the user to make a purchase at a store. In this case, the User Agent 152 determines that the user cannot be in two geographic places at the same time and, thus, flags the two actions and initiates a text message to a smartphone of the user to inform the user about the conflicting events. The user, upon receiving the text message, the user will be informed that there is potential credit card fraud being committed with his or her credit card (if he or she is at home) or that someone is using his or her home computer without permission where the user is at the store making a purchase. In one embodiment, UPDP system 100 is configured to support a context-based data evaluation capability.

The UPDP system 100 is configured to learn the UPDP data management practices of some or all of the users of the UPDP system 100, and to associate priority levels with types of UPDP data based on analysis of the UPDP data management practices of users of the UPDP system 100. The UPDP system 100 is configured to automatically evaluate UPDP data of a user and assign priority levels to the UPDP data of the user based on the data types of the UPDP data of the user and the determined association of priority levels with types of UPDP data for the UPDP system 100 (rather than requiring the user to manually prioritize his or her UPDP data (although the context-based data evaluation capability also may allow manual user override of any automated prioritization performed for the user)). The UPDP system 100 may assign the determined priority levels to the UPDP data of a user via tagging of the UPDP data of the user using the priority levels.

It is noted that the association of priority levels with types of UPDP data may be performed at any suitable granularity (e.g., for all users of the UPDP system 100, for one or more subsets of users (e.g., user groups) of the UPDP system 100, for individual users of the UPDP system 100, and the like, as well as various combinations thereof). In one embodiment, when priority levels are associated with types of UPDP data for all users of the UPDP system 100, assigning priority levels to UPDP data of a user may include identifying data types of UPDP data of the user and assigning priority levels to the UPDP data of the user based on the association of priority levels to data types determined for the UPDP system 100 as a whole. In one embodiment, when priority levels are associated with types of UPDP data for each of a plurality of user groups of the UPDP system 100, assigning priority levels to UPDP data of a user may include identifying which of the user groups with which the user is most closely associated, identifying data types of UPDP data of the user, and assigning priority levels to the UPDP data of the user based on the association of priority levels to data types as determined for that specific user group of the UPDP system 100 (i.e., the data type to priority mapping for the closest user group of the user is used to prioritize the UPDPI data of the user). In one embodiment, when priority levels are associated with types of UPDP data for an individual user of the UPDP system 100, assigning priority levels to UPDP data of the user may include the steps discussed above for associating priority levels with data types (i.e., once the priority levels are associated with the data types for the user, the priority levels can be assigned to the UPDP data of the user directly).

In one embodiment, priority levels are associated with types of UPDP data by computing UPDP scores for the types of data. The UPDP scores determined for types of data may be used as the priority levels for the data types or may be used to determine the priority levels for the data types. The UPDP scores allow the UPDP system 100 to minimize the costs of data storage and retrieval and, further, to maximize value to users so as to provide users with exceptional user experiences. In one embodiment, the UPDP scores are determined by indexing the UPDP data of the UPDP system 100 into metadata, evaluating the indexed structure of metadata based on various parameter buckets and associated parameters, and calculating UPDP scores based on dynamic data usage patterns within the UPDP system 100. It is noted that, as discussed above, calculation of the UPDP scores based on dynamic data usage patterns within the UPDP system 100 may be performed at any suitable granularity (e.g., for all users of the UPDP system 100, for one or more subsets of users (e.g., user groups) of the UPDP system 100, for individual users of the UPDP system 100, and the like, as well as various combinations thereof). The calculation of UPDP scores may be better understood by considering FIGS. 14A, 14B, and 14C.

Figure 14A:
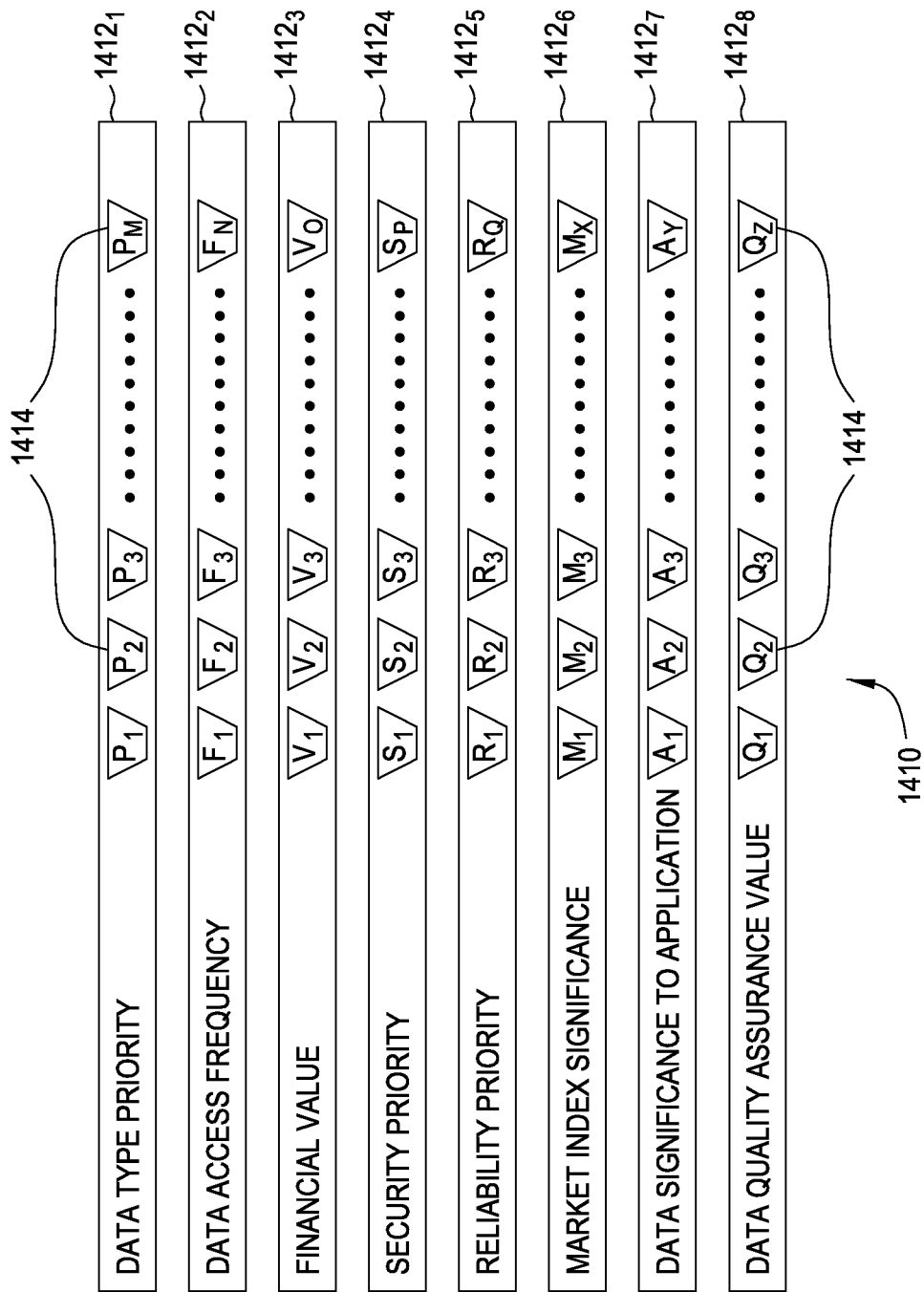
FIG. 14A depicts an exemplary arrangement of parameter classes and associated priority values for a context-based data evaluation capability.

FIG. 14A depicts an exemplary arrangement of parameter classes and associated priority values for a context-based data evaluation capability.

In the exemplary arrangement 1410 of FIG. 14A, parameter sets, parameter types, and/or specific parameters are assigned to parameter classes 1412, and the parameter classes 1412 include sets of priority values 1414, respectively. For each of the parameter classes 1412, the set of priority values 1414 of the parameter classes 1412 is arranged in an order.

As depicted in FIG. 14A, parameter classes 1412 include a Data Type Priority parameter class $1412_1$, a Data Access Frequency parameter class $1412_2$, a Financial Value parameter class $1412_3$, a Security Priority parameter class $1412_4$, a Reliability Priority parameter class $1412_5$, a Market Index Significance parameter class $1412_6$, a Data Significance to Application parameter class $1412_7$, and a Data Quality Assurance Value parameter class $1412_8$. The Data Type Priority parameter class $1412_1$ includes a set of Data Type Priority values $P_1$-$P_M$. The Data Access Frequency parameter class $1412_2$ includes a set of Data Access Frequency priority values $F_1$-$F_N$. The Financial Value parameter class $1412_3$ includes a set of Financial Value priority values $V_1$-$V_O$. The Security Priority parameter class $1412_4$ includes a set of Security Priority values $S_1$-$S_P$. The Reliability Priority parameter class $1412_5$ includes a set of Reliability Priority values $R_1$-$R_Q$. The Market Index Significance parameter class $1412_6$ includes a set of Market Index Significance priority values $M_1$-$M_X$. The Data Significance to Application parameter class $1412_7$ includes a set of Data Significance to Application priority values $A_1$-$A_Y$. The Data Quality Assurance Value parameter class $1412_8$ includes a set of Data Quality Assurance Value priority values $Q_1$-$Q_Z$.

It is noted that the parameter classes 1412, and the associated sets of priority values 1414 of the parameter classes 1412, are merely exemplary. It will be appreciated that fewer or more (including different) parameter classes may be used when computing UPDP scores. Similarly, it will be appreciated that fewer or more (including different) priority values may be used within any of the parameter classes when computing UPDP scores.

Figure 14B:
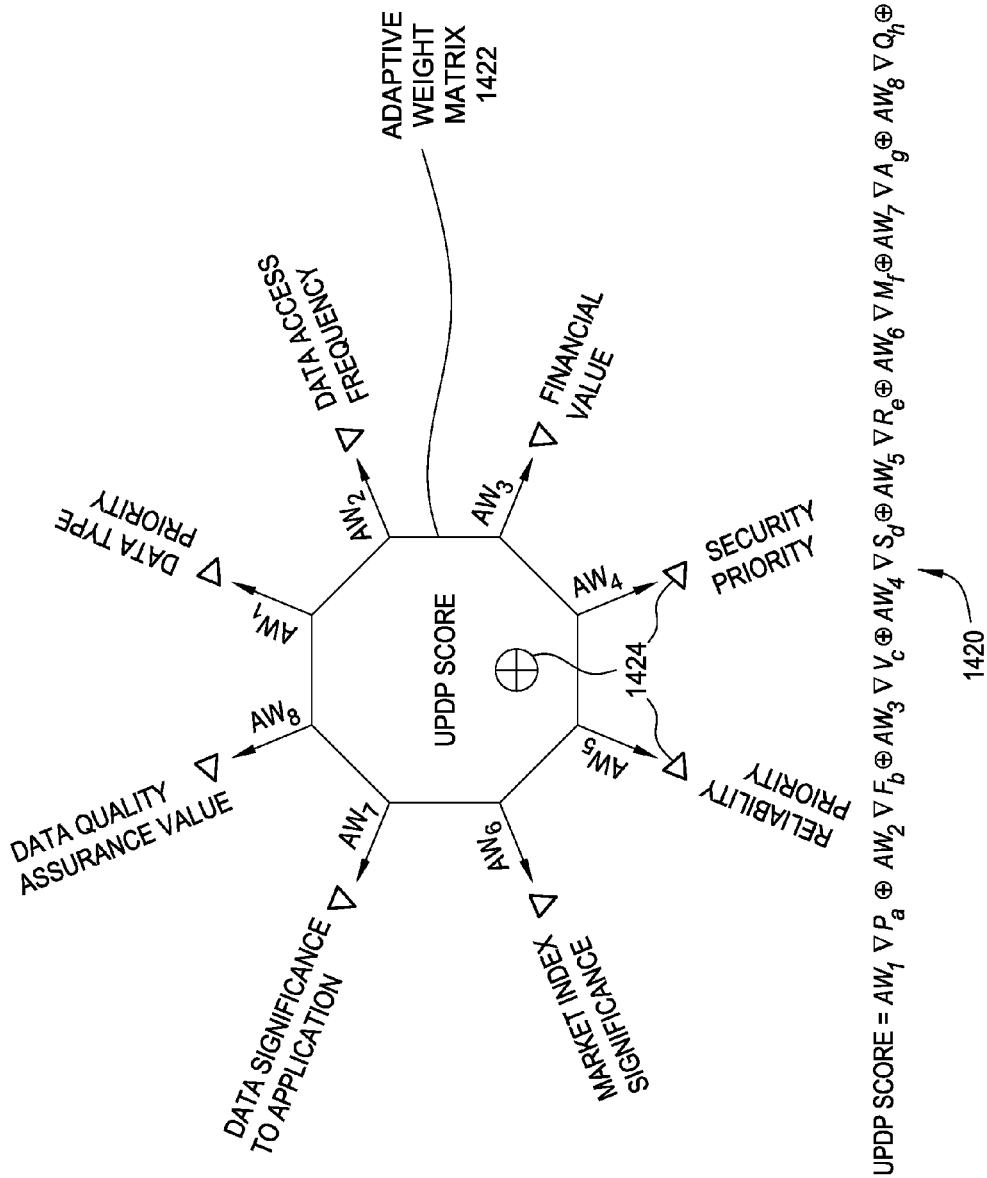
FIG. 14B depicts an exemplary process for determining UPDP scores for a context-based data evaluation capability.

FIG. 14B depicts an exemplary process for determining UPDP scores for a context-based data evaluation capability.

As depicted in FIG. 14B, the exemplary process 1420 for determining UPDP scores uses an Adaptive Weight Matrix 1422 and a pair of fuzzy logic based learning algorithms $1424_1$ and $1424_2$ (collectively, fuzzy logic based learning algorithms 1424).

The exemplary Adaptive Weight Matrix 1422 represents a set of parameter classes 1412. As depicted in FIG. 14B, the parameter classes 1412 depicted and described with respect to FIG. 14A are included in the exemplary Adaptive Weight Matrix 1422 as follows: the Data Type Priority parameter class 1412$_1$ (denoted as AW$_1$), the Data Access Frequency parameter class 1412$_2$ (denoted as AW$_2$), the Financial Value parameter class 1412$_3$ (denoted as AW$_3$), the Security Priority parameter class 1412$_4$ (denoted as AW$_4$), the Reliability Priority parameter class 1412$_5$ (denoted as AW$_5$), the Market Index Significance parameter class 1412$_6$ (denoted as AW$_6$), the Data Significance to Application parameter class 1412$_7$ (denoted as AW$_7$), and the Data Quality Assurance Value parameter class 1412$_8$ (denoted as AW$_8$).

The exemplary Adaptive Weight Matrix 1422 may include one or more components for each of the parameter classes 1412 represented (e.g., one or more of a component for the UPDP system 100 as a whole, a component for a subset of users of the UPDP system 100, and a component for an individual user of the UPDP system 100). In exemplary Adaptive Weight Matrix 1422, the following two components are used for each parameter class 1412 that is represented: a component for the UPDP system 100 as a whole and a component for an individual user of the UPDP system 100.

The fuzzy logic based learning algorithms 1424 (denoted by V and 0, respectively) are configured to determine, for each of the parameter classes 1412 represented in the Adaptive Weight Matrix 1422, the importance of the parameter class 1412 to behavioral usage patterns of the user.

In one embodiment, the UPDP score is determined as UPDP
SCORE=AW$_1$∇P$_a$⊕AW$_2$∇F$_b$⊕AW$_3$∇V$_c$⊕AW$_4$∇S$_d$⊕ AW$_5$∇R$_e$⊕AW$_6$∇M$_f$⊕AW$_7$∇A$_g$⊕AW$_8$∇Q$_h$.

Figure 14C:
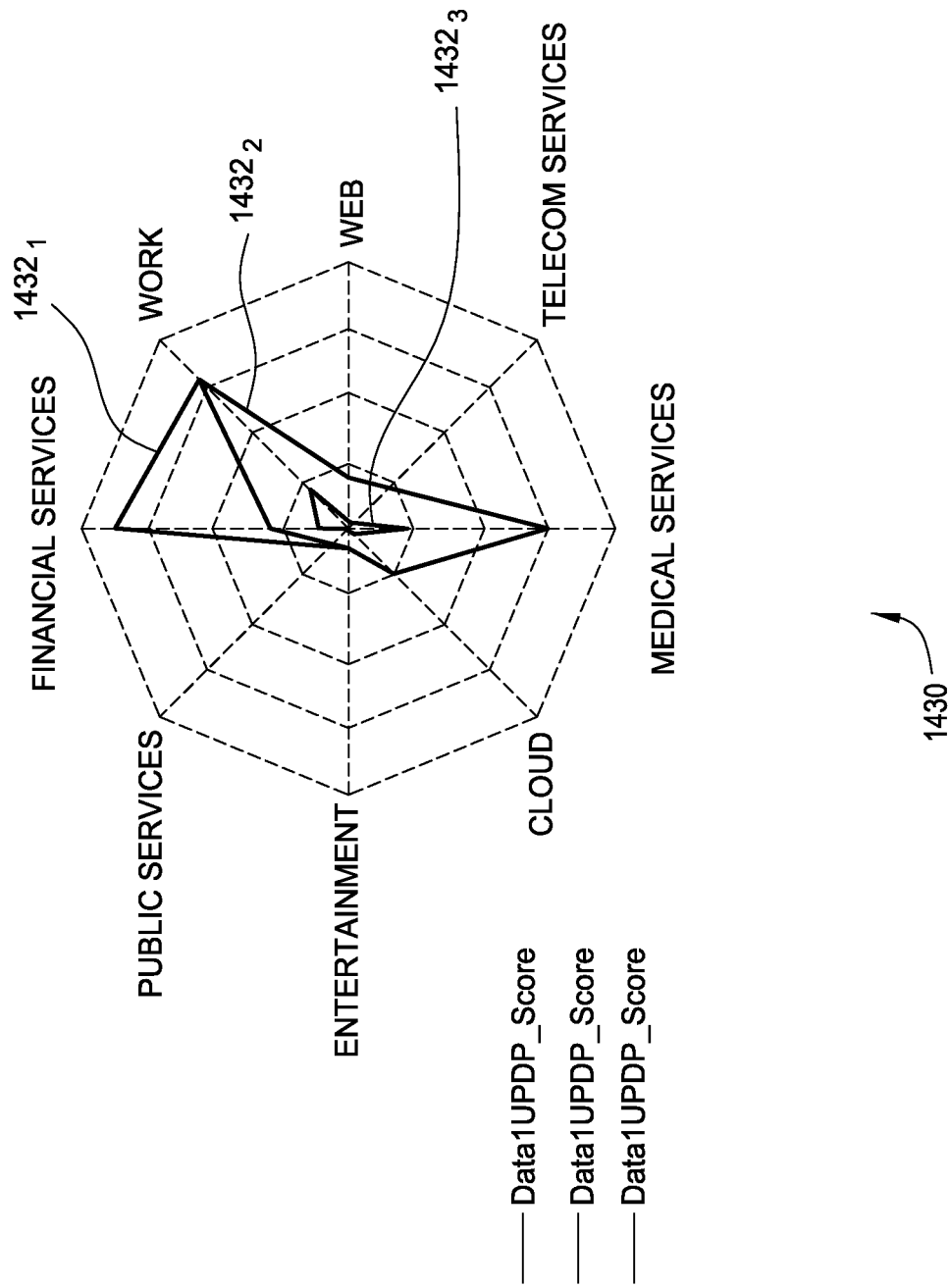
FIG. 14C depicts an exemplary radar chart of UPDP scores for data sets for a context-based data evaluation capability.

FIG. 14C depicts an exemplary radar chart of UPDP scores for data sets for a context-based data evaluation capability.

As depicted in FIG. 14C, exemplary radar chart 1430 includes eight axes representing eight types of UPDP data which may be maintained in a UPDP Store of a user. The eight types of UPDP data include Financial Services data, Work data, Web data, Telecom Services data, Medical Services data, Cloud data, Entertainment data, and Public Services data.

As further depicted in FIG. 14C, UPDP scores for three exemplary data sets are plotted on exemplary radar chart 1430. The plot 1432$_1$ on the radar chart 1430 for the first exemplary data set (not compared to the other exemplary data sets) includes relatively high UPDP scores for the Financial Services and Work data types, a relatively low UPDP score for the Entertainment data type, and UPDP scores of zero for each of the other data types represented on radar chart 1430. The plot 1432$_2$ on the radar chart 1430 for the second exemplary data set (not compared to the other exemplary data sets) includes relatively high UPDP scores for the Work and Medical Services data types and relatively low UPDP scores for each of the other data types represented on radar chart 1430. The plot 1432$_3$ on the radar chart 1430 for the third exemplary data set (not compared to the other exemplary data sets) includes relatively high UPDP scores for the Financial Services, Work, and Medical Services data types and relatively low UPDP scores for each of the other data types represented on radar chart 1430. Additionally, when comparing UPDP scores between the data sets, it is noted that: (1) for the Financial Services data type, the UPDP score for the first data set is greater than the UPDP score for the second data set which is greater than the UPDP score for the third data set, (2) for the Work data type, the UPDP scores for the first and second data sets are nearly identical and are both significantly greater than the UPDP score for the third data set, (3) for the Medical Services data type, the UPDP score for second data set is greater than the UPDP score for the third data set, and (4) for all of the data types, the UPDP scores of the second data set are greater than the UPDP scores of the third data set. It is noted that other results/observations may be obtained from the exemplary radar chart 1430.

The prioritization of UPDP data of a user may be used to provide various functions. In one embodiment, prioritization of UPDP data of a user may be used to determine a subset of the UPDP data of the user that is ported into the UPDP Store of the user where the storage space of the UPDP Store of the user is not sufficient to support storage of all of the UPDP data of the user. In one embodiment, prioritization of UPDP data of a user may be used to organize the UPDP data of the user for faster access by the user from the UPDP Store of the user. The prioritization of UPDP data of a user may be used to provide various other related functions.

Figure 15:
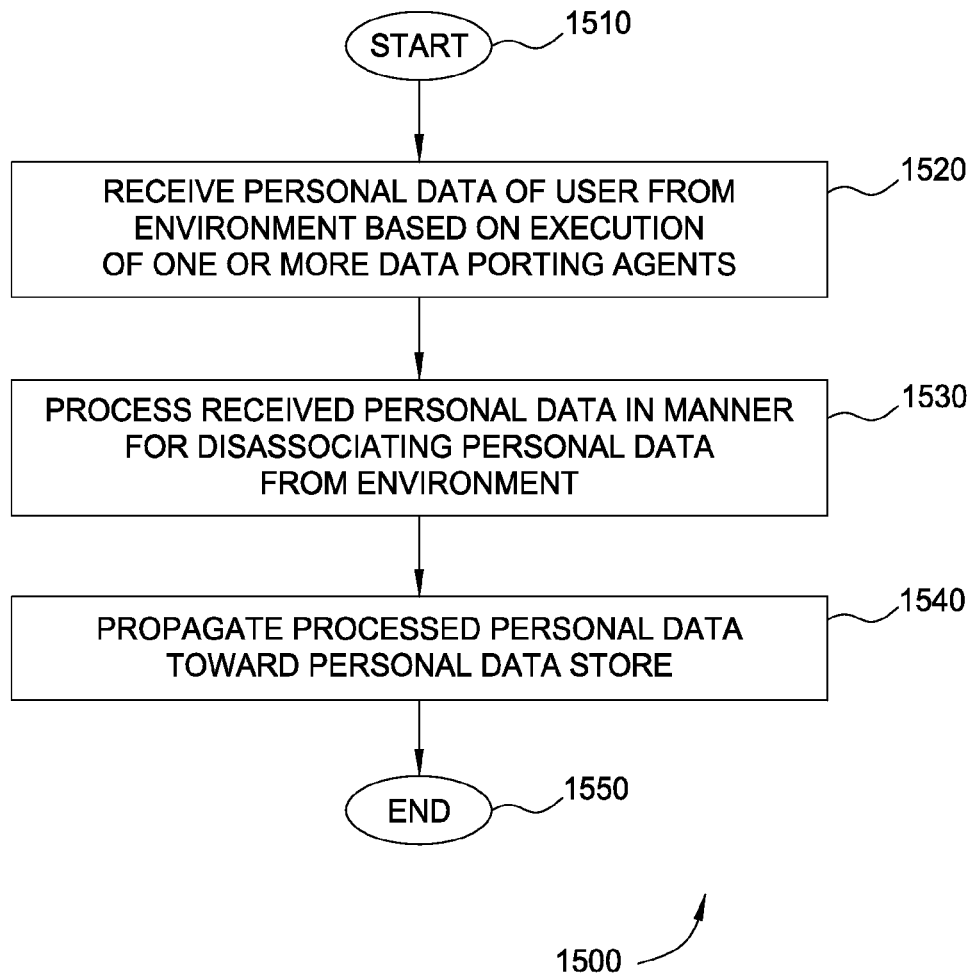
FIG. 15 depicts one embodiment of a method performed by a UPDP Core Engine.

FIG. 15 depicts one embodiment of a method performed by a UPDP Core Engine. Although primarily depicted and described herein as being performed serially, it will be appreciated that the steps of method 1500 may be performed contemporaneously and/or in a different order than depicted and described with respect to FIG. 15.

At step 1510, method 1500 begins.

At step 1520, personal data of a user is received from an environment based on execution of one or more data porting agents.

At step 1530, the received personal data is processed in a manner for disassociating the personal data from the environment.

At step 1540, the processed personal data is propagated toward the personal data store of the user.

At step 1550, method 1500 ends.

Figure 16:
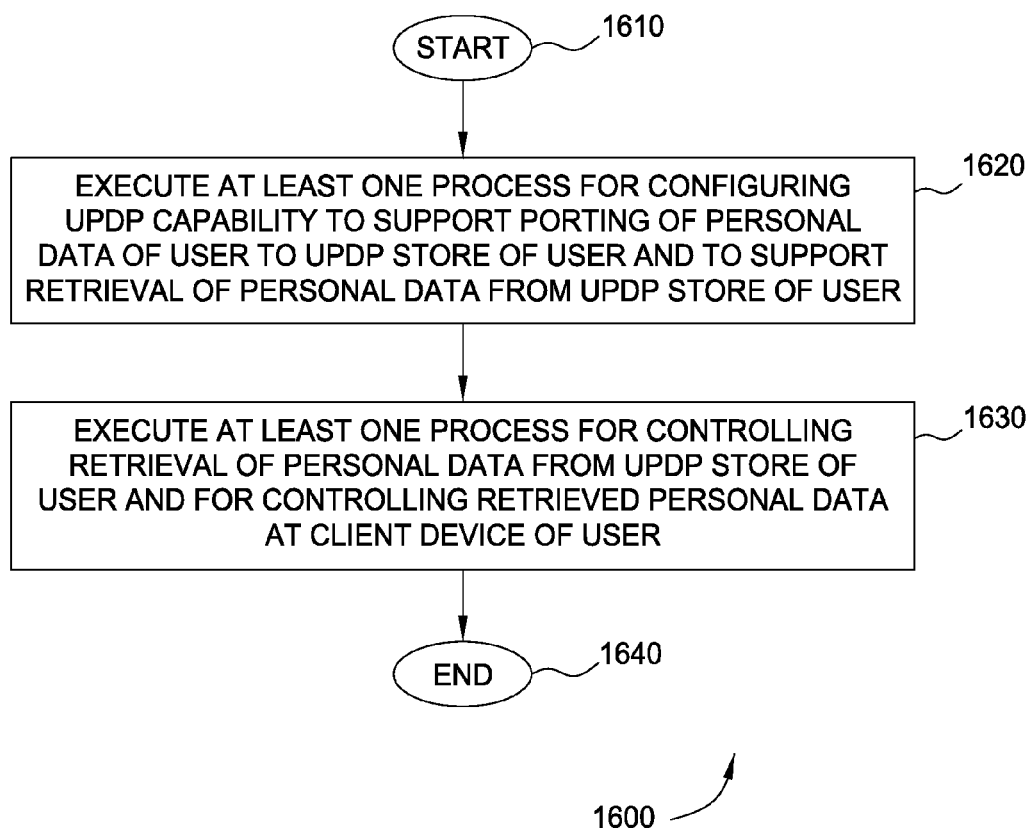
FIG. 16 depicts one embodiment of a method performed by the UPDP Client Module of a client device.

FIG. 16 depicts one embodiment of a method performed by the UPDP Client Module of a client device. Although primarily depicted and described herein as being performed serially, it will be appreciated that the steps of method 1600 may be performed contemporaneously and/or in a different order than depicted and described with respect to FIG. 16.

At step 1610, method 1600 begins.

At step 1620, at least one process is executed for configuring a UPDP capability to support porting of personal data of the user to a UPDP Store of the user and retrieval of personal data from the UPDP Store of the user. This may include one or more processes for configuring the UPDP Store of the user (e.g., definition of data types, organization of personal data within the UPDP Store, membership/ownership of the UPDP Store, opening of data sharing ports of the UPDP Store, and the like, as well as various combinations thereof). This may include one or more processes for configuring the UPDP Agents to control porting of personal data of the user to the UPDP Store of the user (e.g., configuration of types of personal data ported from environments, configuration of the timing of the porting of personal data from environments, and the like, as well as various combinations thereof).

At step 1630, at least one process is executed for controlling retrieval of personal data from the UPDP Store of the user and controlling the retrieved personal data at the client device of the user. The control over the retrieved personal data may include controlling organization of the retrieved personal data based on data type, providing one or more interfaces via which the user may interact with the retrieved personal data, and the like, as well as various combinations thereof.

At step 1640, method 1600 ends.

Figure 17:
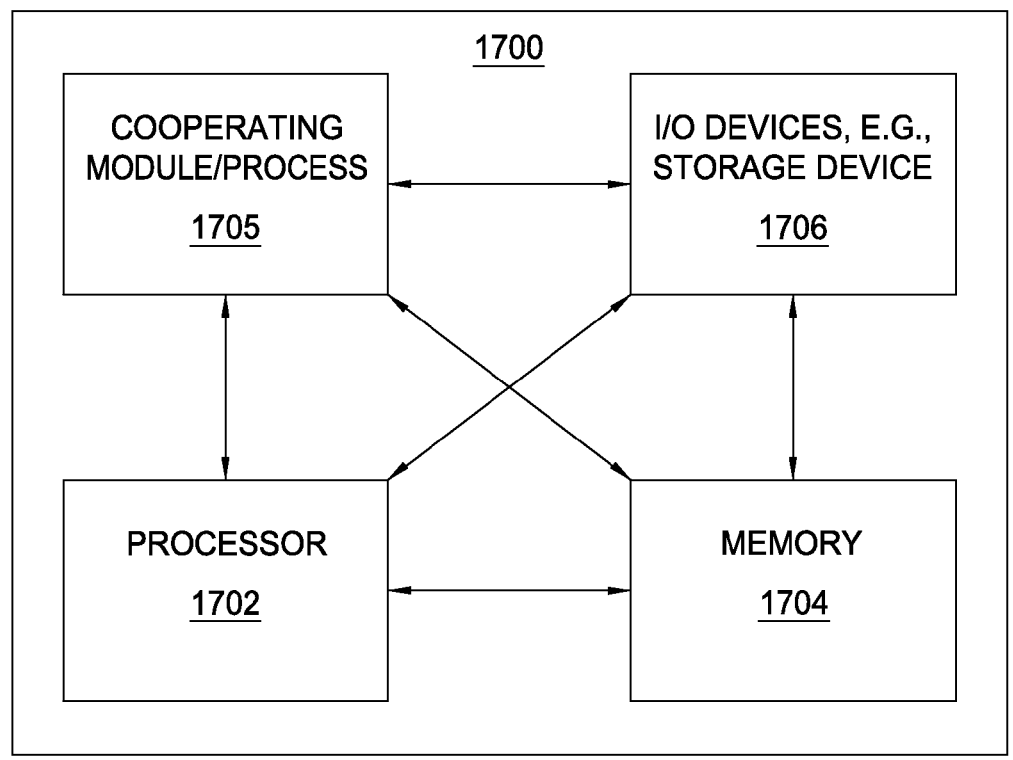
FIG. 17 depicts a high-level block diagram of a computer suitable for use in performing functions described herein.

FIG. 17 depicts a high-level block diagram of a computer suitable for use in performing functions described herein.

As depicted in FIG. 17, computer 1700 includes a processor element 1702 (e.g., a central processing unit (CPU) and/or other suitable processor(s)) and a memory 1704 (e.g., random access memory (RAM), read only memory (ROM), and the like). The computer 1700 also may include a cooperating module/process 1705 and/or various input/output devices 1706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

In one embodiment, the cooperating process 1705 can be loaded into memory 1704 and executed by the processor 1702 to implement functions as discussed herein. Thus, cooperating process 1705 (including associated data structures) can be stored on a computer readable storage medium, e.g., RAM memory, magnetic or optical drive or diskette, and the like.

It will be appreciated that computer 1700 depicted in FIG. 17 provides a general architecture and functionality suitable for implementing functional elements described herein and/or portions of functional elements described herein. For example, the computer 1700 provides a general architecture and functionality suitable for implementing any of the elements/functions/processes depicted and described with respect to any of FIGS. 1-16.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
propagate, toward a core data porting engine storing a set of data porting agents configured to control porting of personal data of a user from a set of environments storing personal data of the user to the personal data store of the user, configuration information for configuring one of the data porting agents, wherein the one of the data porting agents is configured to be executed by the core data porting engine for initiating porting of personal data of the user from one or more of the environment storing the personal data of the user to the personal data store of the user, wherein respective portions of the personal data stored in the personal data store have assigned thereto respective data types from a set of data types configured to decouple the respective portions of the personal data from the environments from which the respective portions of the personal data are ported;
propagate, toward the personal data store, a request to retrieve a requested portion of the personal data from the personal data store, wherein the requested portion of the personal data is associated with two or more of the data types;
receive the requested portion of the personal data from the personal data store; and
organize the requested portion of the personal data based on the two or more data types of the requested portion of the personal data.

2. The apparatus of claim 1, wherein the processor is configured to:
initiate presentation of the organized personal data; and
provide an interface configured for use by the user in viewing and controlling the organized personal data.

3. The apparatus of claim 1, wherein the processor is configured to provide user control over the personal data of the user based on the data types of the personal data of the user.

4. The apparatus of claim 1, wherein the memory stores a plurality of personal data access applications configured to provide access to respective portions of the personal data of the user based on the respective data types of the respective portions of the personal data of the user.

5. The apparatus of claim 1, wherein the data types are based on at least one of a market segment, an environment type, and an application type.

6. The apparatus of claim 1, wherein the processor is configured to:
control a data porting filter setting indicative of whether additional personal data of the user that is intended for storage in one of the environments is to be sent to the personal data store of the user after or before being provided to the one of the environments.

7. The apparatus of claim 6, wherein the processor is configured to:
communicate an indication of the data porting filter setting toward the core data porting engine.

8. The apparatus of claim 1, wherein the processor is configured to:
receive, from the core data porting engine, a template configured for use in configuring at least one feature of the personal data store; and
propagate information entered via the template toward the core data porting engine for use by the core data porting engine to configure at least one feature of the personal data store.

9. The apparatus of claim 1, wherein the processor is configured to:
receive, from the core data porting engine, a template configured for use in configuring an additional data porting agent to control porting of personal data of the user from one or more of the environments or a new environment to the personal data store; and propagate information entered via the template toward the core data porting engine for use by the core data porting engine to configure the additional data porting agent.

10. The apparatus of claim 1, wherein the processor is configured to:
  detect a request to modify at least one of an owner of the personal data store and a member of the personal data store.

11. The apparatus of claim 1, wherein a set of personal data stored in the personal data store of the user is associated with a first environment of the set of environments, wherein the processor is configured to:
  detect a request to transfer the set of personal data from the personal data store of the user to a second environment of the set of environments.

12. The apparatus of claim 1, wherein the processor is configured to:
  detect a request of the user to share a portion of the personal data of the user without sharing other portions of the personal data of the user; and
  initiate opening of a data sharing port for the portion of the personal data of the user to be shared, the opening of the data sharing port configured to enable one or more entities other than the user to access the portion of the personal data of the user to be shared.

13. A method, comprising:
  using a processor and a memory for:
    propagating, toward a core data porting engine storing a set of data porting agents configured to control porting of personal data of a user from a set of environments storing personal data of the user to the personal data store of the user, configuration information for configuring one of the data porting agents, wherein the one of the data porting agents is configured to be executed by the core data porting engine for initiating porting of personal data of the user from one or more of the environment storing the personal data of the user to the personal data store of the user, wherein respective portions of the personal data stored in the personal data store have assigned thereto respective data types from a set of data types configured to decouple the respective portions of the personal data from the environments from which the respective portions of the personal data are ported;
    propagating, toward the personal data store, a request to retrieve a requested portion of the personal data from the personal data store, wherein the requested portion of the personal data is associated with two or more of the data types;
    receiving the requested portion of the personal data from the personal data store and
    organizing the requested portion of the personal data based on the two or more data types of the requested portion of the personal data.

14. An apparatus, comprising:
  a processor and a memory communicatively connected to the processor, the processor configured to:
    receive, from a core data porting engine, a template configured for use in configuring a data porting agent to control porting of personal data of a user from one or more environments storing personal data of the user to a personal data store of the user; and
    propagate information entered via the template toward the core data porting engine for use by the core data porting engine to configure the data porting agent to control porting of personal data of the user from the one or more environments storing personal data of the user to the personal data store of the user, wherein the data porting agent is configured to be executed, by the core data porting engine, for initiating porting of personal data of the user from the one or more environments storing the personal data of the user to the personal data store of the user.

15. The apparatus of claim 14, wherein the processor is configured to:
  receive, from the core data porting engine, a template configured for use in configuring the personal data store, wherein the template configured for use in configuring the personal data store is configured to enable at least one of:
    setting of an ownership setting of the personal data store;
    setting of a membership setting of the personal data store;
    indicating a request to transfer personal data, ported to the personal data store from a first one of the environments, from the personal data store of the user to a second one of the environments; and
    indicating a request of the user to share a portion of the personal data of the user via opening of a data sharing port for the portion of the personal data of the user without sharing other portions of the personal data of the user.

16. The apparatus of claim 14, wherein the template configured for use in configuring the data porting agent is configured to enable at least one of:
  initializing establishment of the data porting agent for controlling porting of personal data of the user from the one or more environments to the personal data store; and
  modifying at least one parameter of the data porting agent—for controlling porting of personal data of the user from the one or more environments to the personal data store.

17. The apparatus of claim 14, wherein the processor is configured to:
  propagate, toward the core data porting engine, a data porting filter setting indicative of whether additional personal data of the user that is intended for storage in one of the one or more environments is to be sent to the personal data store of the user after or before being provided to the one of the one or more environments.

18. The apparatus of claim 14, wherein the processor is configured to:
  propagate, toward the personal data store, a request to retrieve a requested portion of the personal data from the personal data store, wherein respective portions of the personal data stored in the personal data store have assigned thereto respective data types from a set of data types configured to decouple the respective portions of the personal data from the one or more environments from which the personal data is ported;
  receive the requested portion of the personal data, the requested portion of the personal data including personal data of two or more of the data types; and
  organize the requested portion of the personal data based on the two or more data types of the requested portion of the personal data.

19. The apparatus of claim 14, wherein the processor is configured to:

detect a request to modify at least one of an owner of the personal data store and a member of the personal data store.

20. The apparatus of claim 14, wherein a set of personal data stored in the personal data store of the user is associated with a first environment, wherein the processor is configured to:
   detect a request to transfer the set of personal data from the personal data store of the user to a second environment.

21. The apparatus of claim 14, wherein the processor is configured to:
   detect a request of the user to share a portion of the personal data of the user without sharing other portions of the personal data of the user; and
   initiate opening of a data sharing port for the portion of the personal data of the user to be shared, the opening of the data sharing port configured to enable one or more entities other than the user to access the portion of the personal data of the user to be shared.

22. A method, comprising:
   using a processor and a memory for:
      receiving, from a core data porting engine, a template configured for use in configuring a data porting agent to control porting of personal data of a user from one or more environments storing the personal data of the user to a personal data store of the user; and
      propagating information entered via the template toward the core data porting engine for use by the core data porting engine to the data porting agent to control porting of personal data of the user from the one or more environments storing the personal data of the user to the personal data store of the user, wherein the data porting agent is configured to be executed, by the core data porting engine, for initiating porting of personal data of the user from the one or more environments storing the personal data of the user to the personal data store of the user.

* * * * *